(12) United States Patent
Jang et al.

(10) Patent No.: US 9,515,798 B2
(45) Date of Patent: Dec. 6, 2016

(54) METHOD AND APPARATUS FOR ALLOCATING ENHANCED PHYSICAL DOWNLINK CONTROL CHANNEL IN WIRELESS ACCESS SYSTEM

(75) Inventors: Jiwoong Jang, Anyang-si (KR); Jaehoon Chung, Anyang-si (KR); Hyunsoo Ko, Anyang-si (KR)

(73) Assignee: LG Electronics Inc., Seoul (KR)

( * ) Notice: Subject to any disclaimer, the term of this patent is extended or adjusted under 35 U.S.C. 154(b) by 176 days.

(21) Appl. No.: 14/233,534

(22) PCT Filed: Jul. 20, 2012

(86) PCT No.: PCT/KR2012/005815
§ 371 (c)(1),
(2), (4) Date: Jan. 17, 2014

(87) PCT Pub. No.: WO2013/012283
PCT Pub. Date: Jan. 24, 2013

(65) Prior Publication Data
US 2014/0192753 A1    Jul. 10, 2014

Related U.S. Application Data

(60) Provisional application No. 61/509,586, filed on Jul. 20, 2011, provisional application No. 61/511,100, filed on Jul. 24, 2011.

(51) Int. Cl.
*H04W 4/00* (2009.01)
*H04L 5/00* (2006.01)
*H04L 27/26* (2006.01)

(52) U.S. Cl.
CPC ............ *H04L 5/0053* (2013.01); *H04L 5/0094* (2013.01); *H04L 5/0007* (2013.01); *H04L 5/0051* (2013.01); *H04L 27/2633* (2013.01); *H04L 27/2636* (2013.01)

(58) Field of Classification Search
CPC ............................ H04L 5/0053; H04L 5/0094
See application file for complete search history.

(56) References Cited

U.S. PATENT DOCUMENTS

| 2011/0075624 A1 | 3/2011 | Papasakellariou et al. |
| 2011/0170496 A1 | 7/2011 | Fong et al. |
| 2013/0003604 A1* | 1/2013 | Blankenship ......... H04L 5/0053 370/255 |

OTHER PUBLICATIONS

3GPP TSG-RAN1 #65 meeting, "Discussion on Downlink Control Channel Enhancement" Barcelona, Spain, May 9-13, 2011.
3GPP TSG-RAN WG1 #57, "Control channel design for the support of wider bandwith for LTE-Advanced" San Francisco, US, May 4-8, 2009.

* cited by examiner

Primary Examiner — Derrick Ferris
Assistant Examiner — Farhad Ali
(74) Attorney, Agent, or Firm — Dentons US LLP

(57) ABSTRACT

If a PDCCH is multiplexed with data in a DMRS based manner, an E-PDCCH may be allocated by frequency-first mapping in reverse time order, starting from an OFDM symbol carrying the last DMRS in the first slot of a PRB allocated to a UE. For example, the E-PDCCH may be mapped to a resource region in the manner illustrated in FIG. 27. For reference, various signals may mapped to a resource region of a subframe in following manner: (1) CRSs or DMRSs may be mapped to the resource region of the subframe, (2) a legacy PDCCH may be mapped to the resource region, and then (3) the E-PDCCH may be mapped to the remaining region.

12 Claims, 27 Drawing Sheets

FIG. 10
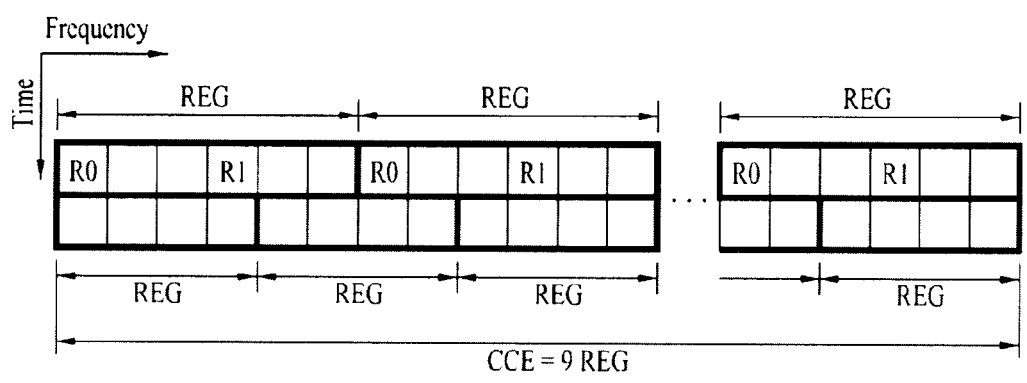
(a) 1 or 2 TX case
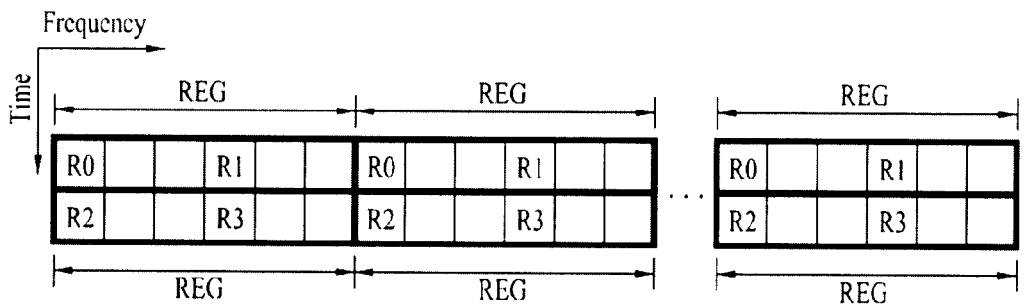
(b) 4 TX case

FIG. 13
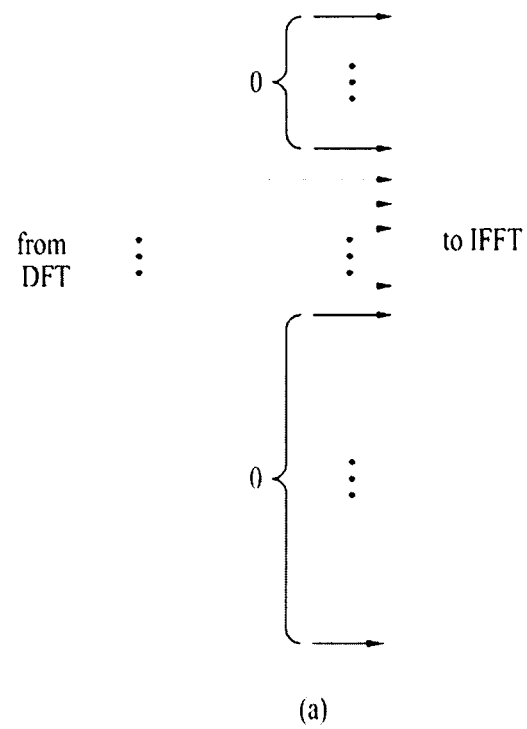
(a)
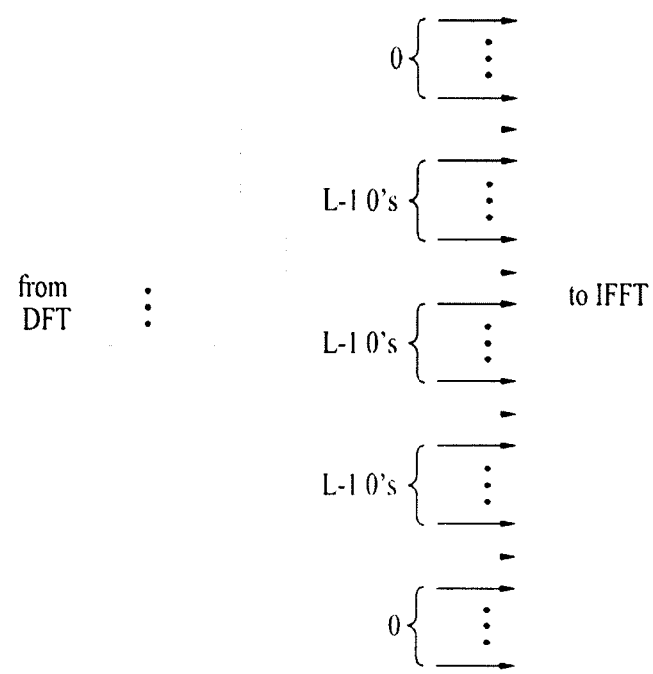
(b)

FIG. 14
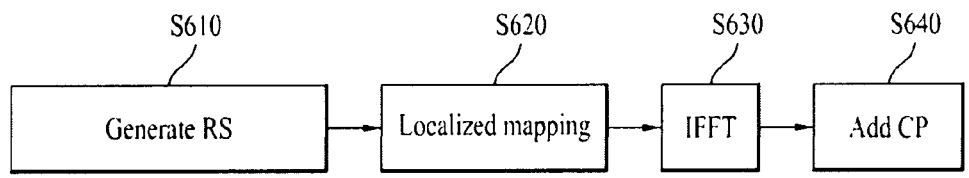
FIG. 15
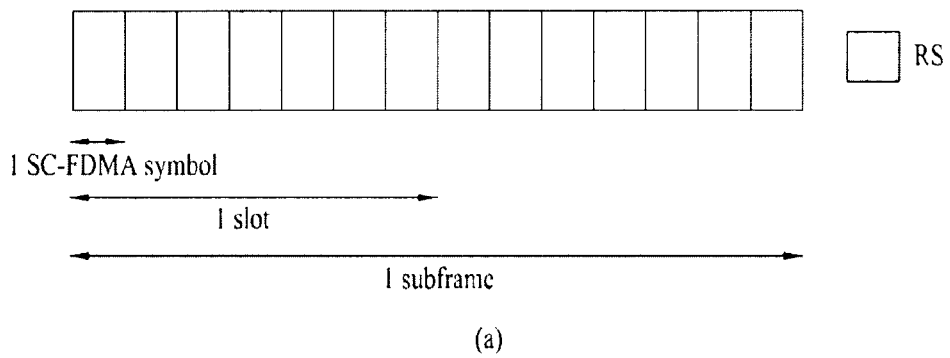
(a)
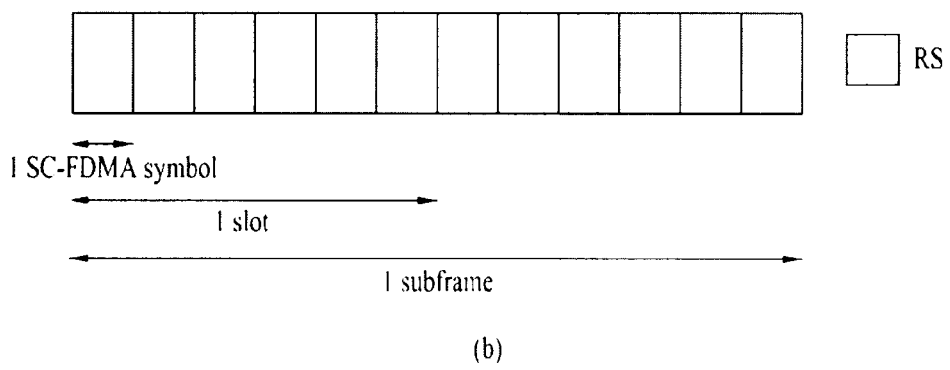
(b)

FIG. 20
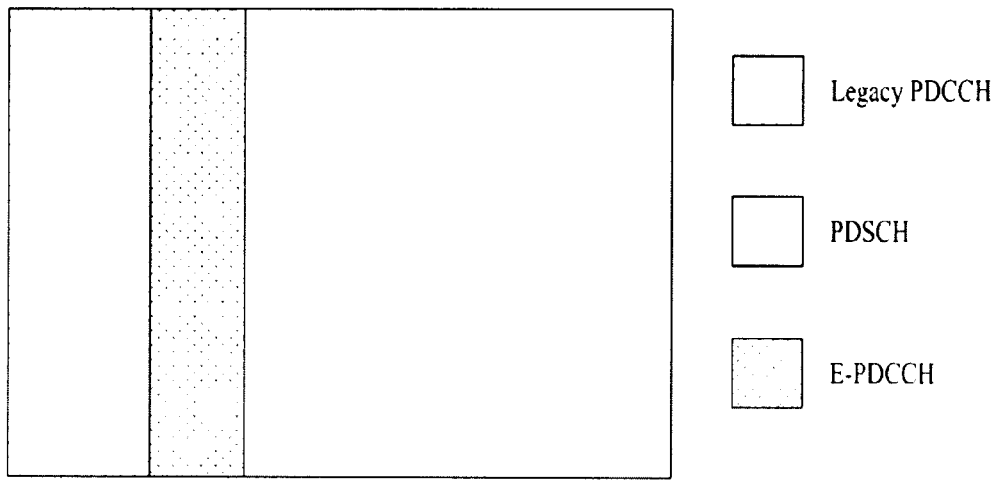
(a)
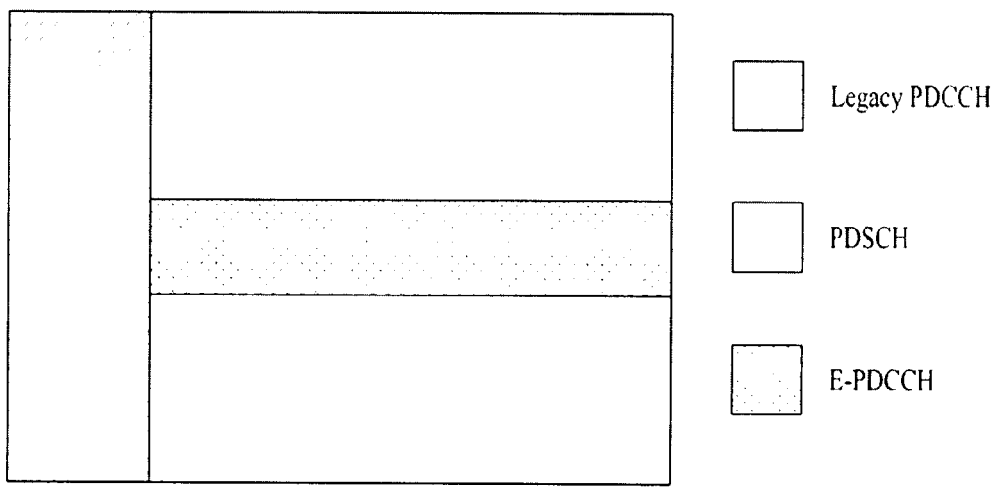
(b)

METHOD AND APPARATUS FOR ALLOCATING ENHANCED PHYSICAL DOWNLINK CONTROL CHANNEL IN WIRELESS ACCESS SYSTEM

This application is a 35 USC §371 National Stage entry of International Application No. PCT/KR2012/005815, filed on Jul. 20, 2012, and claims priority of U.S. Provisional Application No. 61/509,586 filed Jul. 20, 2011, and 61/511,100 filed Jul. 24, 2011 which are each hereby incorporated by reference in its entirety.

TECHNICAL FIELD

The present invention relates to a wireless access system, and more particularly, to a method for allocating and transmitting an Enhanced Physical Downlink Control Channel (E-PDCCH) and an apparatus supporting the same.

BACKGROUND ART

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

DISCLOSURE

Technical Problem

An object of the present invention devised to solve the problem lies on a method for efficiently transmitting and receiving control information.

Another object of the present invention is to provide a new Physical Downlink Control Channel (PDCCH) structure that does not affect a legacy PDCCH structure and a legacy Physical Downlink Shared Channel (PDSCH) structure.

Another object of the present invention is to provide an Enhanced Physical Downlink Control Channel (E-PDCCH) that reduces the power consumption of a User Equipment (UE), decreases a decoding delay, and is excellent in terms of resource efficiency, without affecting a legacy UE (e.g., a Long Term Evolution-Advanced (LTE-A) Rel-8/9/10 UE).

Another object of the present invention is to provide an apparatus supporting the above methods.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

The present invention provides various methods for allocating and transmitting an Enhanced Physical Downlink Control Channel (E-PDCCH) and apparatuses supporting the same.

In an aspect of the present invention, a method for receiving an E-PDCCH signal in a wireless access system includes receiving an E-PDCCH indication signal including information indicating the presence or absence of an E-PDCCH signal and resource allocation information indicating a resource region of the E-PDCCH signal, and receiving the E-PDCCH signal in the resource region indicated by the resource allocation information. The E-PDCCH indication signal is transmitted in a legacy PDCCH region.

In another aspect of the present invention, a method for transmitting an E-PDCCH signal in a wireless access system includes transmitting an E-PDCCH indication signal including information indicating the presence or absence of an E-PDCCH signal and resource allocation information indicating a resource region of the E-PDCCH signal, and transmitting the E-PDCCH signal in the resource region indicated by the resource allocation information. The E-PDCCH indication signal is transmitted in a legacy PDCCH region.

In another aspect of the present invention, a User Equipment (UE) for receiving an E-PDCCH signal in a wireless access system includes a reception module, a transmission module, and a processor configured to support reception of an E-PDCCH signal. The UE receives an E-PDCCH indication signal including information indicating the presence or absence of an E-PDCCH signal and resource allocation information indicating a resource region of the E-PDCCH signal through the reception module, and receives the E-PDCCH signal in the resource region indicated by the resource allocation information through the reception module. The E-PDCCH indication signal is transmitted in a legacy PDCCH region.

In the aspects of the present invention, the E-PDCCH indication signal may be transmitted in a Common Search Space (CSS).

The E-PDCCH indication signal may be transmitted in a first Control Channel Element (CCE) of the legacy PDCCH region.

The resource region of the E-PDCCH signal may be configured based on Cell-specific Reference Signal (CRS) or Demodulation Reference Signal (DMRS).

The resource region of the E-PDCCH signal may be allocated only to a first slot of a subframe carrying the E-PDCCH indication signal.

The afore-described aspects of the present invention are merely a part of preferred embodiments of the present invention. Those skilled in the art will derive and understand various embodiments reflecting the technical features of the present invention from the following detailed description of the present invention.

Advantageous Effects

According to the embodiments of the present invention, the following effects can be achieved.

First, an evolved Node B (eNB) and a UE can transmit and receive control information efficiently.

Secondly, backward compatibility with a legacy system can be maintained and limited radio resources can be efficiently used by using a new PDCCH structure that does not affect a legacy PDCCH structure and a legacy PDSCH structure.

Thirdly, the power consumption of a UE and a decoding delay can be decreased using a new E-PDCCH without affecting a legacy UE (e.g. an LTE-A Rel-8/9/10 UE).

It will be appreciated by persons skilled in the art that that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention, illustrate embodiments of the invention and together with the description serve to explain the principle of the invention.

In the drawings:

FIG. 10 illustrates resources units used to configure a control channel according to embodiments of the present invention;

FIG. 13 illustrates frequency-domain signal mapping methods that satisfy a single carrier property in the frequency domain, which may be used in embodiments of the present invention;

FIG. 14 is a block diagram illustrating an operation for transmitting a Reference Signal (RS) for use in demodulating an SC-FDMA transmission signal;

FIG. 15 illustrates the positions of symbols to which RSs are mapped in an SC-FDMA subframe structure;

FIG. 20 illustrates exemplary subframe structures each including an Enhanced Physical Downlink Control Channel (E-PDCCH) according to an embodiment of the present invention;

BEST MODE

Figure 1:
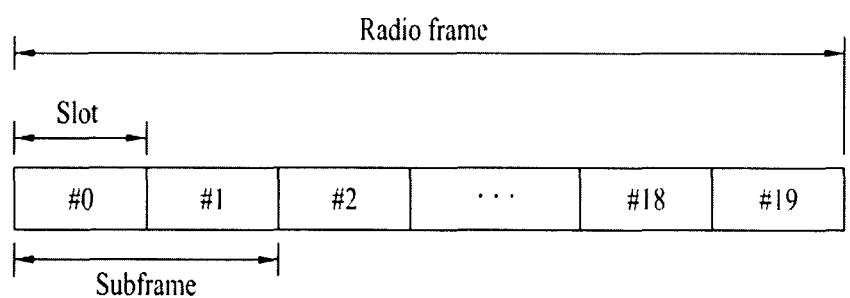
FIG. 1 illustrates a radio frame structure which may be used in embodiments of the present invention.

Embodiments of the present invention provide various methods for allocating and transmitting an Enhanced Physical Downlink Control Channel (E-PDCCH) and apparatuses supporting the same.

The embodiments of the present invention described below are combinations of elements and features of the present invention in specific forms. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or elements of any one embodiment may be included in another embodiment and may be replaced with corresponding constructions or features of another embodiment.

In the description of the attached drawings, a detailed description of known procedures or steps of the present invention will be avoided lest it should obscure the subject matter of the present invention. In addition, procedures or steps that could be understood to those skilled in the art will not be described either.

In the embodiments of the present invention, a description is mainly made of a data transmission and reception relationship between a Base Station (BS) and a User Equipment (UE). A BS refers to a terminal node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), an Advanced Base Station (ABS), an access point, etc.

In the embodiments of the present invention, the term terminal may be replaced with a UE, a Mobile Station (MS), a Subscriber Station (SS), a Mobile Subscriber Station (MSS), a mobile terminal, an Advanced Mobile Station (AMS), etc.

A transmitter is a fixed and/or mobile node that provides a data service or a voice service and a receiver is a fixed and/or mobile node that receives a data service or a voice service. Therefore, a UE may serve as a transmitter and a BS may serve as a receiver, on an UpLink (UL). Likewise, the UE may serve as a receiver and the BS may serve as a transmitter, on a DownLink (DL).

The embodiments of the present invention may be supported by standard specifications disclosed for at least one of wireless access systems including an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. In particular, the embodiments of the present invention may be supported by the standard specifications, 3GPP TS 36.211, 3GPP TS 36.212, 3GPP TS 36.213, and 3GPP TS 36.321. That is, the steps or parts, which are not described to clearly reveal the technical idea of the present invention, in the embodiments of the present invention may be explained by the above standard specifications. All terms used in the embodiments of the present invention may be explained by the standard specifications.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific terms in order to provide a thorough understanding of the present invention. However, it will be apparent to those skilled in the art that the specific terms may be replaced with other terms without departing the technical spirit and scope of the present invention.

The embodiments of the present invention can be applied to various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

CDMA may be implemented as a radio technology such as Universal Terrestrial Radio Access (UTRA) or CDMA2000. TDMA may be implemented as a radio technology such as Global System for Mobile communications (GSM)/General packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved UTRA (E-UTRA), etc.

UTRA is a part of Universal Mobile Telecommunications System (UMTS). 3GPP LTE is a part of Evolved UMTS (E-UMTS) using E-UTRA, adopting OFDMA for DL and SC-FDMA for UL. LTE-Advanced (LTE-A) is an evolution of 3GPP LTE. While the embodiments of the present invention are described in the context of a 3GPP LTE/LTE-A system in order to clarify the technical features of the present invention, the present invention is also applicable to an IEEE 802.16e/m system, etc.

1. 3GPP LTE/LTE-A System

In a wireless access system, a UE receives information from an eNB on a DL and transmits information to the eNB on a UL. The information transmitted and received between the UE and the eNB includes general data information and various types of control information. There are many physical channels according to the types/usages of information transmitted and received between the eNB and the UE.

FIG. 1 illustrates a radio frame structure which may be used in embodiments of the present invention.

A radio frame includes 10 subframes, each subframe having two slots. A time required to transmit a subframe is defined as a Transmission Time Interval (TTI). One subframe is 1 ms long and one slot is 0.5 ms.

A slot includes a plurality of Orthogonal Frequency Division Multiplexing (OFDM) symbols in the time domain by a plurality of Resource Blocks (RBs) in the frequency domain. An OFDM symbol represents one symbol period in the 3GPP LTE system that adopts OFDMA for DL. That is, an OFDM symbol may be called an SC-FDMA symbol or symbol period according to a multiple access scheme. An RB is a resource allocation unit including a plurality of consecutive subcarriers in one slot.

The radio frame structure illustrated in FIG. 1 is purely exemplary. Thus, the number of subframes in a radio frame, the number of slots in a subframe, and the number of OFDM symbols in a slot may be changed.

Figure 2:
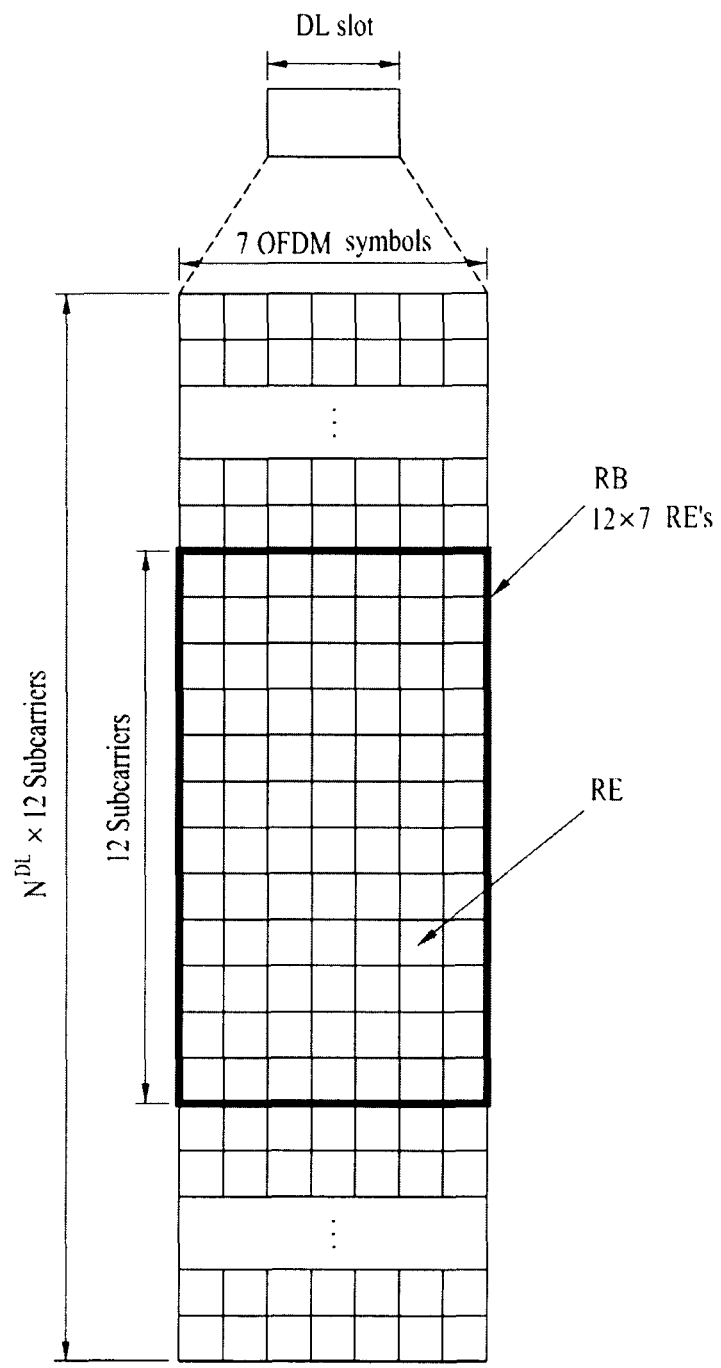
FIG. 2 illustrates a structure of a DownLink (DL) resource grid for the duration of one DL slot, which may be used in embodiments of the present invention.

FIG. 2 illustrates an exemplary structure of a DL resource grid for the duration of one DL slot, which may be used in embodiments of the present invention.

Referring to FIG. 2, a DL slot includes a plurality of OFDM symbols in the time domain. One DL slot includes 7 OFDM symbols in the time domain and an RB includes 12 subcarriers in the frequency domain, by way of example.

Each element of the resource grid is referred to as a Resource Element (RE). An RB includes 12×7 REs. The number of RBs in a DL slot, $N_{DL}$ depends on a DL transmission bandwidth. A UL slot may have the same structure as a DL slot.

Figure 3:
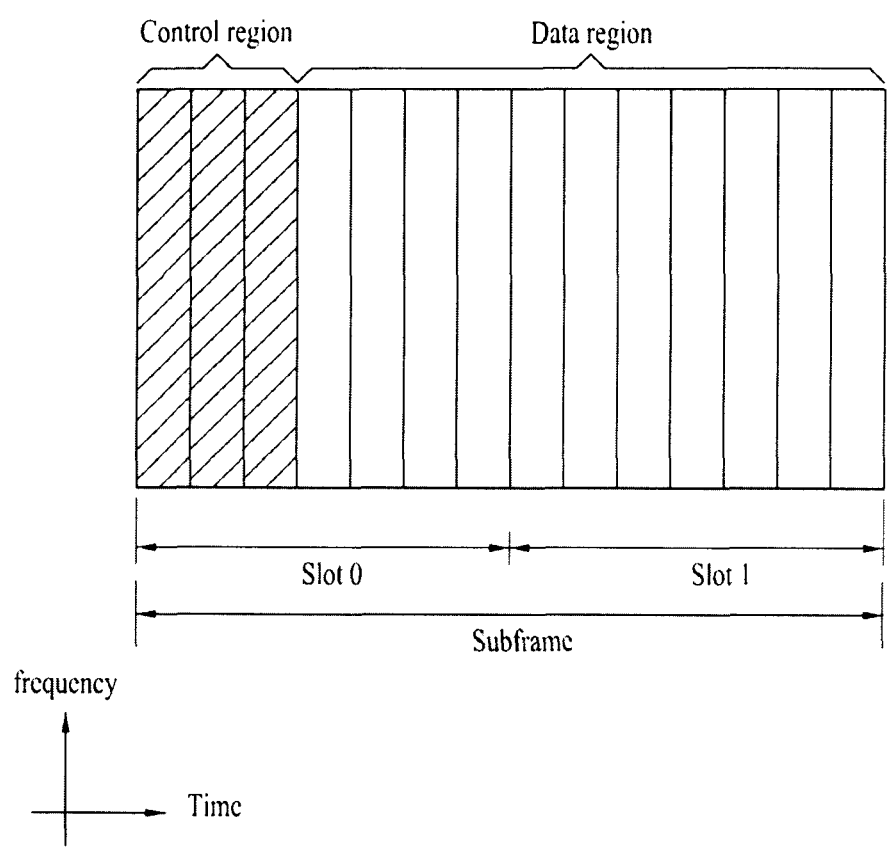
FIG. 3 illustrates a structure of a DL subframe, which may be used in embodiments of the present invention.

FIG. 3 illustrates a structure of a DL subframe that may be used in embodiments of the present invention.

Referring to FIG. 3, a DL subframe includes two slots in the time domain. Up to three OFDM symbols of the first slot of the DL subframe are used as a control region to which control channels are allocated and the other OFDM symbols of the DL subframe are used as a data region to which a Physical Downlink Shared Channel (PDSCH) is allocated.

DL control channels defined for the 3GPP LTE system include a Physical Control Format Indicator Channel (PCFICH), a PDCCH, and a Physical Hybrid ARQ Indicator Channel (PHICH). The PCFICH is transmitted in the first OFDM symbol of a subframe, carrying information about the number of OFDM symbols used for transmission of control channels (i.e. the size of the control region) in the subframe. The PHICH is a response channel to a UL transmission, delivering an HARQ ACK/NACK signal. That is, an ACK/NACK signal for UL data transmitted by a UE is transmitted on a PHICH.

Control information carried on the PDCCH is called Downlink Control Information (DCI). The DCI transports resource allocation information and other control information for a UE or a UE group, for example, UL resource allocation information, DL resource allocation information, or UL Transmission (Tx) power control commands.

The PDCCH may deliver information about resource allocation and a transport format for a Downlink Shared Channel (DL-SCH) (i.e. a DL grant), information about resource allocation and a transport format for an Uplink Shared Channel (UL-SCH) (i.e. a UL grant), paging information of a Paging Channel (PCH), system information on the DL-SCH, information about resource allocation for a higher-layer control message such as a random access response transmitted on the PDSCH, a set of Tx power control commands for individual UEs of a UE group, Voice Over Internet Protocol (VoIP) activation indication information, etc.

A plurality of PDCCHs may be transmitted in the control region. A UE may monitor a plurality of PDCCHs. A PDCCH is transmitted in one or more consecutive Control Channel Elements (CCEs). A CCE is a logical allocation unit used to provide a PDCCH at a code rate based on the state of a radio channel. A CCE includes a plurality of RE Groups (REGs). The format of a PDCCH and the number of available bits for the PDCCH are determined according to the relationship between the number of CCEs and a code rate provided by the CCEs. An eNB determines a PDCCH format according to DCI that will be transmitted to a UE and adds a Cyclic Redundancy Check (CRC) to the control information.

The CRC is masked by a unique Identifier (ID) (e.g. a Radio Network Temporary Identifier (RNTI)) according to the owner or usage of the PDCCH. If the PDCCH is destined for a specific UE, the CRC may be masked by a unique ID (e.g. a cell-RNTI (C-RNTI)) of the UE. If the PDCCH carries a paging message, the CRC of the PDCCH may be masked by a paging indicator ID (e.g. a Paging-RNTI (P-RNTI)). If the PDCCH carries system information, particularly, a System Information Block (SIB), its CRC may be masked by a system information ID (e.g. a System Information RNTI (SI-RNTI)). To indicate that the PDCCH carries a random access response to a random access preamble transmitted by a UE, its CRC may be masked by a Random Access-RNTI (RA-RNTI).

In a Carrier Aggregation (CA) environment, a PDCCH may be transmitted in one or more Component Carriers (CCs) and may include resource allocation information about one or more CCs. For example, while a PDCCH is transmitted in a single CC, the PDCCH may deliver resource allocation information about one or more Physical Downlink Shared Channels (PDSCHs) and Physical Uplink Shared Channels (PUSCHs).

Figure 4:
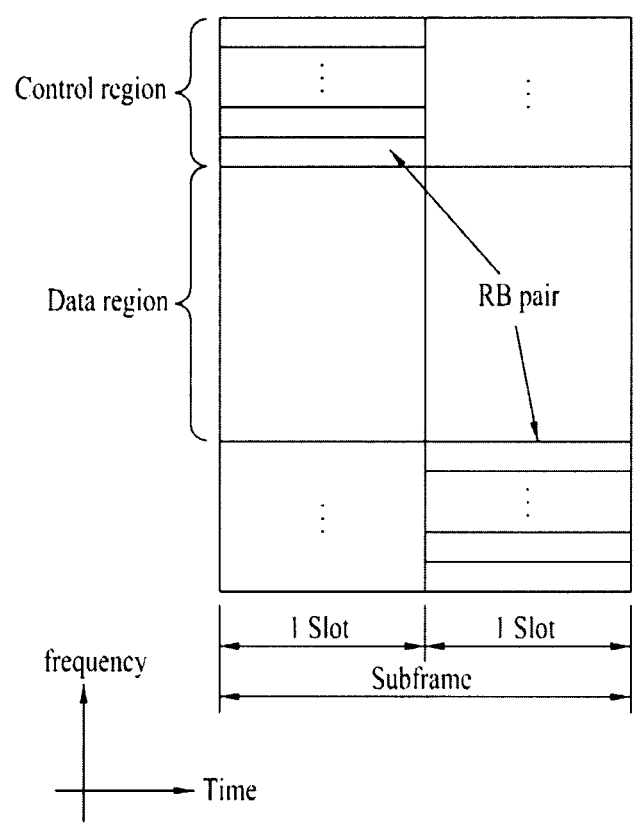
FIG. 4 illustrates a structure of an UpLink (UL) subframe, which may be used in embodiments of the present invention.

FIG. 4 illustrates a structure of a UL subframe which may be used in embodiments of the present invention.

Referring to FIG. 4, a UL subframe includes a plurality of (e.g. 2) slots. A slot may include a different number of SC-FDMA symbols according to a Cyclic Prefix (CP) length. The UL subframe is divided into a control region and a data region in the frequency domain. The data region includes a PUSCH to transmit a data signal such as voice and the control region includes a Physical Uplink Control Channel (PUCCH) to transmit Uplink Control Information (UCI). The PUCCH occupies a pair of RBs at both ends of the data region on a frequency axis and the RB pair frequency-hops over a slot boundary.

In the LTE system, a UE does not transmit a PUCCH signal and a PUSCH signal simultaneously in order to maintain a single carrier property. However, in the LTE-A system, a UE may transmit a PUCCH signal and a PUSCH signal simultaneously in the same subframe according to the transmission mode of the UE and the PUCCH signal may be piggybacked to the PUSCH signal, for transmission.

A pair of RBs in a subframe are allocated to a PUCCH for a UE. The RBs of the RB pair occupy different subcarriers in two slots. Thus it is said that the RB pair frequency-hops over a slot boundary.

The PUCCH may deliver the following control information.

Scheduling Request (SR): information requesting UL-SCH resources. An SR is transmitted in On-Off Keying (OOK).

HARQ ACK/NACK: a response signal to a DL data packet received on a PDSCH or a PDCCH indicating Semi-Persistent Scheduling (SPS) release, indicating whether the DL data packet or the PDCCH indicating SPS release has been received successfully. A 1-bit ACK/NACK is transmitted as a response to a single DL codeword and a 2-bit ACK/NACK is transmitted as a response to two DL codewords. In Time Division Duplex (TDD), ACK/NACK responses to a plurality of DL subframes may be transmitted on a single PUCCH through bundling or multiplexing.

Channel Quality Indicator (CQI) or Channel State Information (CSI): feedback information regarding a DL channel. Multiple Input Multiple Output (MIMO)-related feedback information includes a Rank Indicator (RI), a Precoding Matrix Index (PMI), and a Precoding Type Indicator (PTI). The CSI occupies 20 bits per subframe. In embodiments of the present invention, the CSI conceptually covers the CQI, the RI, and the PMI.

The amount of UCI that the UE may transmit in a subframe depends on the number of SC-FDMA symbols available for transmission of control information. The remaining SC-FDMA symbols except SC-FDMA symbols allocated to RSs in a subframe are available for transmission of control information. If the subframe carries a Sound Reference Signal (SRS), the last SC-FDMA symbol of the subframe is also excluded from transmission of the control information. The RSs are used for coherent detection of a PUCCH. The PUCCH supports 7 formats according to information carried on the PUCCH.

[Table 1] illustrates the mapping relationship between PUCCH formats and UCI in the LTE system.

TABLE 1

| PUCCH format | UCI |
| --- | --- |
| Format 1 | SR |
| Format 1a | 1-bit HARQ ACK/NACK with or without SR |
| Format 1b | 2-bit HARQ ACK/NACK with or without SR |
| Format 2 | CQI (20 coded bits) |
| Format 2 | CQI and 1-bit or 2-bit HARQ ACK/NACK for extended CP |
| Format 2a | CQI and 1-bit HARQ ACK/NACK |
| Format 2b | CQI and 2-bit HARQ ACK/NACK |

Figure 5:
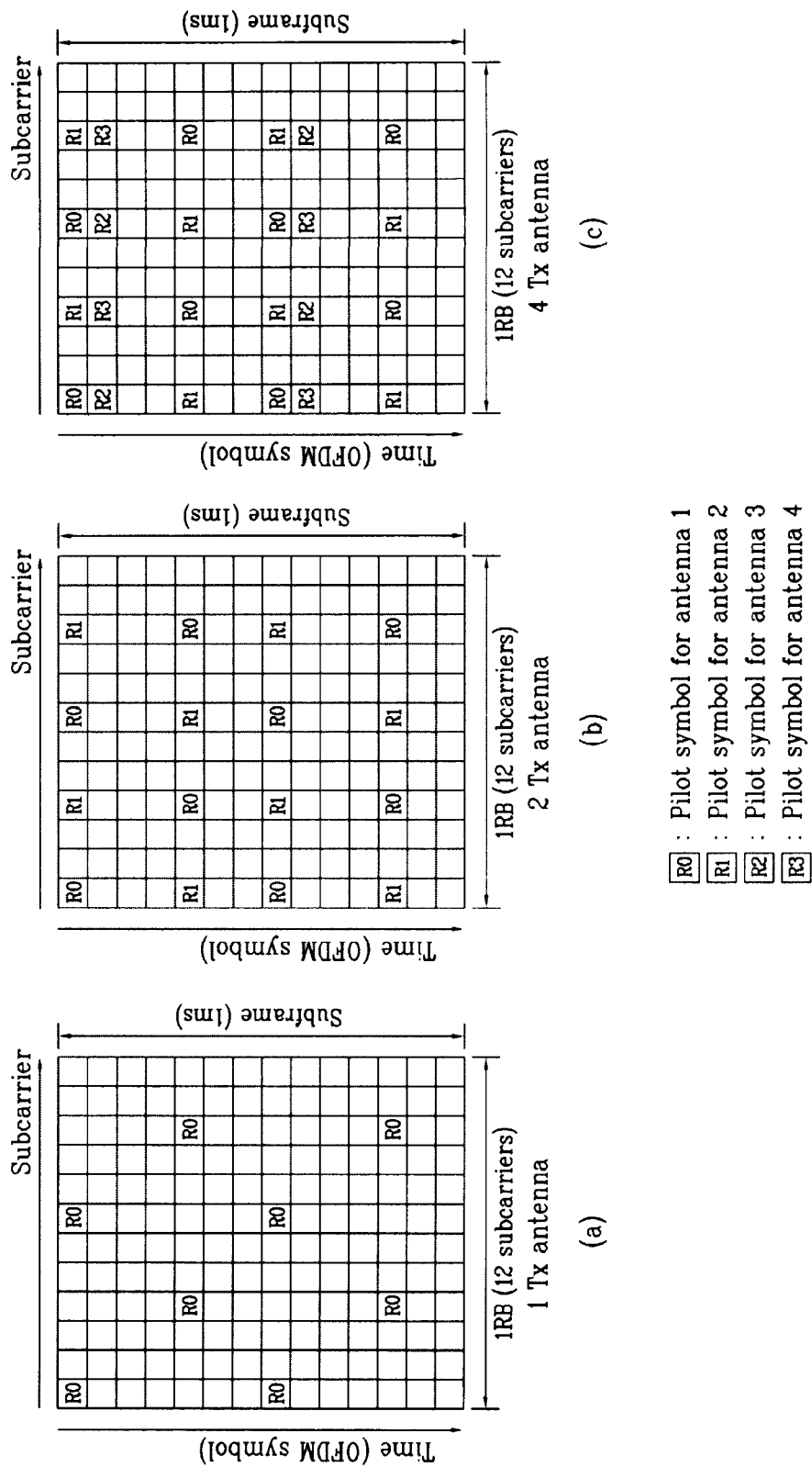
FIG. 5 illustrates exemplary pilot symbol structures according to the numbers of Transmission (Tx) antennas, which may be used in embodiments of the present invention.

FIG. 5 illustrates exemplary pilot symbol structures according to the numbers of Transmission (Tx) antennas, which may be used in embodiments of the present invention.

Pilot symbols are used generally in the field of data transmission. The pilot symbols are used to achieve the timing of a reference carrier for demodulation or the timing of each channel at a transmitter/receiver. Apart from pilot symbol, various terms such as RS are used in various communication systems. In embodiments of the present invention, a pilot symbol refers to any symbol or signal which is transmitted with high transmission power without carrying actual data, for use in channel synchronization, synchronization of carrier phase, or acquisition of eNB information.

FIG. 5 illustrates the positions of pilot symbols transmitted through Tx antennas according to the numbers of Tx antennas. In FIG. 5, Ri represents a pilot symbol for an $i^{th}$ Tx antenna. Specifically, FIG. 5(a) illustrates the positions of pilot symbols for one Tx antenna, FIG. 5(b) illustrates the positions of pilot symbols for two Tx antennas, and FIG. 5(c) illustrates the positions of pilot symbols for four Tx antennas.

As noted from FIG. 5, pilot symbols are arranged with a predetermined frequency spacing and a predetermined time spacing. If the number of Tx antennas increases as illustrated in FIG. 5, the overhead of pilot symbols may be increased.

If the pilot symbol structures illustrated in FIG. 5 are adopted for sector 1 of an eNB, pilot symbols may be protected by shifting the pilot symbols on a subcarrier basis in the frequency domain or on an OFDM symbol basis in the time domain in order to prevent pilot symbol collision between cells in sector 2 and sector 3. Now a description will be given of a method for cancelling interference by shifting a pilot channel on a subcarrier basis or on an OFDM symbol basis.

Figure 6:
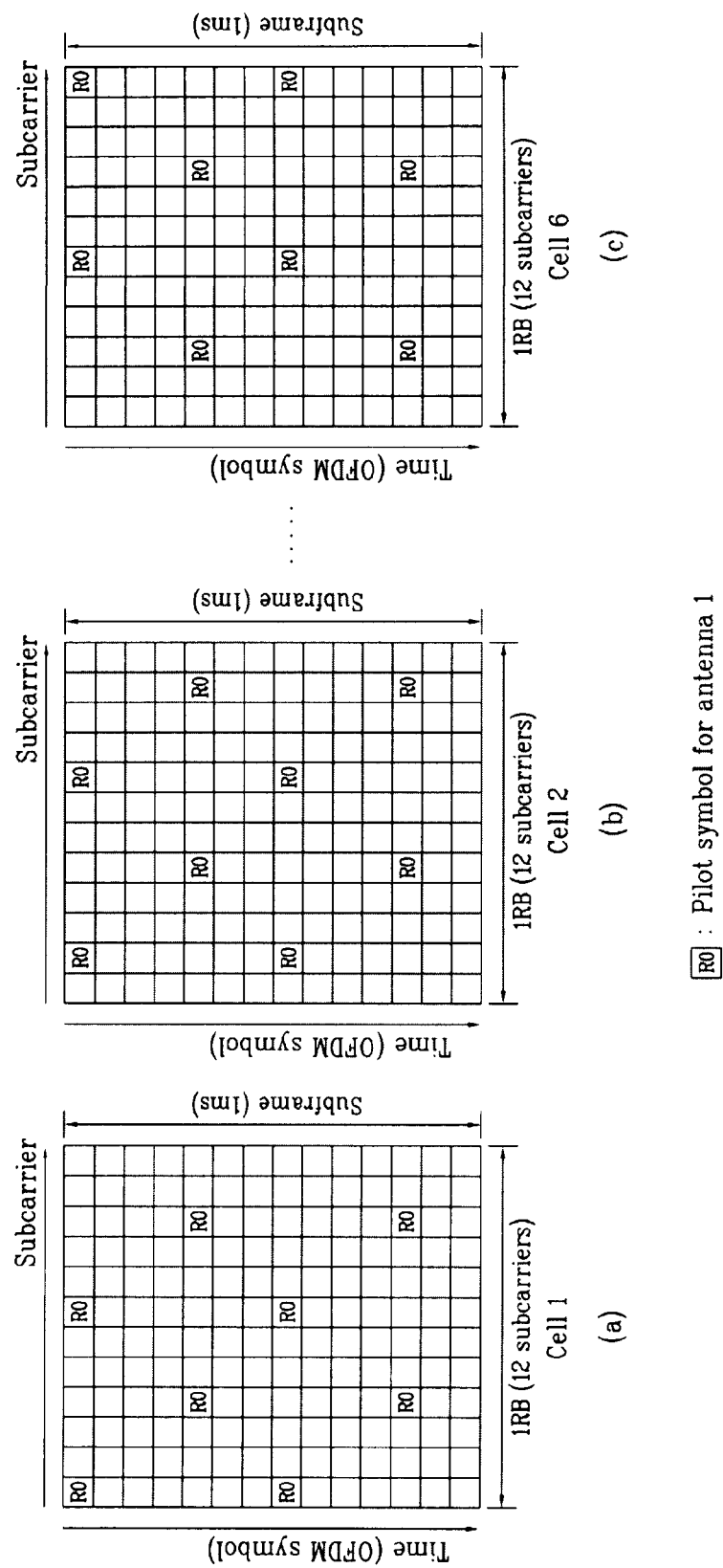
FIG. 6 illustrates an exemplary method for shifting pilot symbols on a subcarrier basis in the case of 1 Tx transmission.

FIG. 6 illustrates an exemplary method for shifting pilot symbols on a subcarrier basis in the case of 1 Tx antenna.

Referring to FIG. 6, pilot symbols are spaced from each other by 6 subcarriers in the frequency domain in FIG. 6(a) in the case of 1 Tx antenna. Accordingly, the pilot symbols may be disposed at different positions in at least five cells by shifting the pilot symbols on a subcarrier basis in the frequency domain. That is, it is revealed from FIG. 6 that a plurality of adjacent cells, Cell 1 to Cell 6 avoid collision between pilot symbols by frequency shifting.

Figure 7:
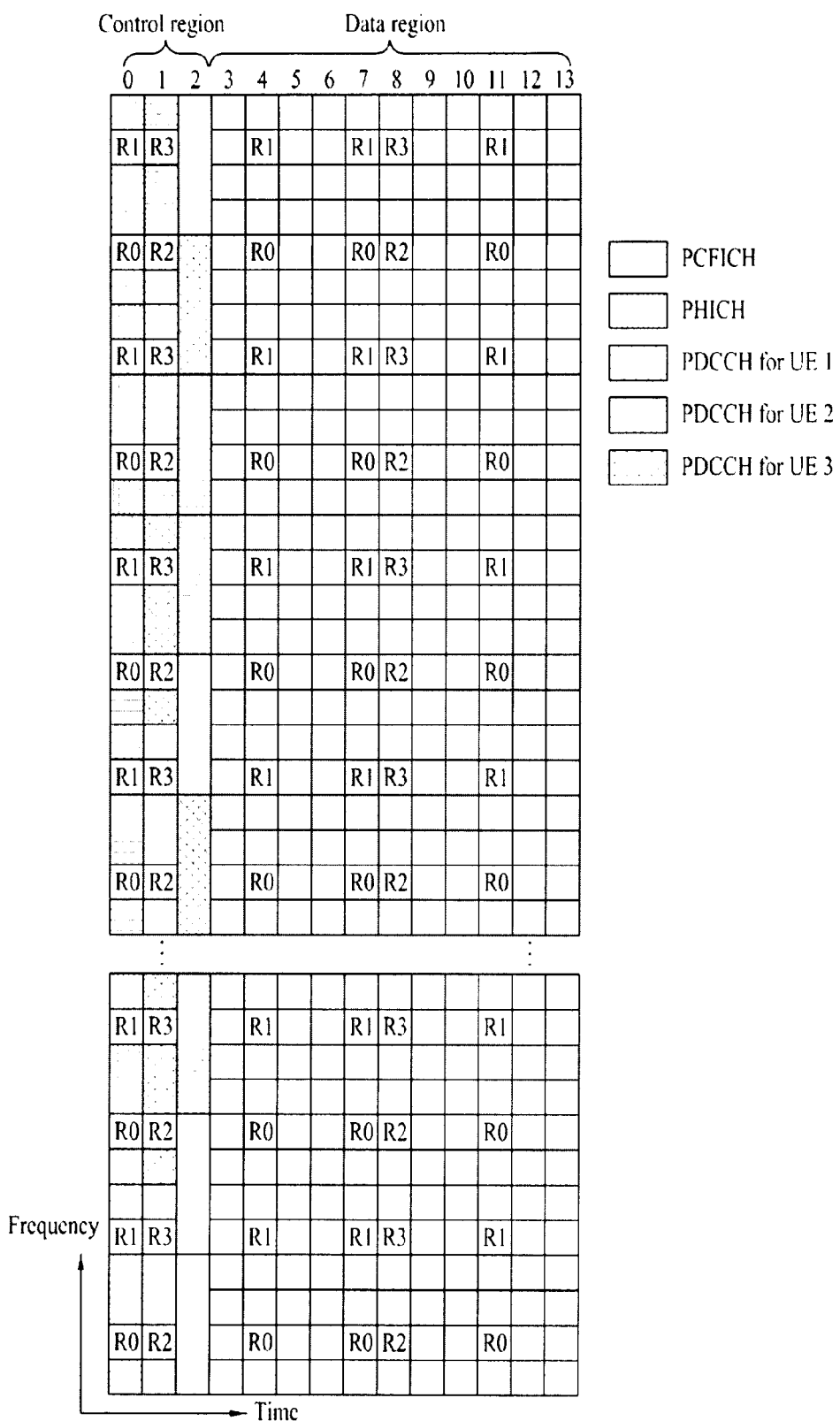
FIG. 7 illustrates an example of allocating control channels to a DL subframe, which may be used in embodiments of the present invention.

FIG. 7 illustrates an example of allocating control channels to a DL subframe, which may be used in embodiments of the present invention.

Referring to FIG. 7, a subframe includes 14 OFDM symbols. The first three OFDM symbols of the subframe are allocated to a control region, whereas the remaining 11 OFDM symbols are allocated to a data region. In FIG. 7, R0, R1, R2, and R3 denote Common RSs (CRSs) for antenna 0, antenna 1, antenna 2, and antenna 3, respectively. The CRSs are arranged in a subframe according to a predetermined pattern irrespective of the control region and the data region. A control channel is allocated to resources that do not have CRSs in the control region and a traffic channel is also allocated to resources that do not have CRSs in the data region. Control channels allocated to the control region include (1) a PCFICH used to adjust the number of OFDM symbols for a DL control channel in each subframe, (2) a PHICH carrying a DL ACK/NACK, and (3) a PCCH carrying control information for DL/UL data transmission/reception.

Figure 8:
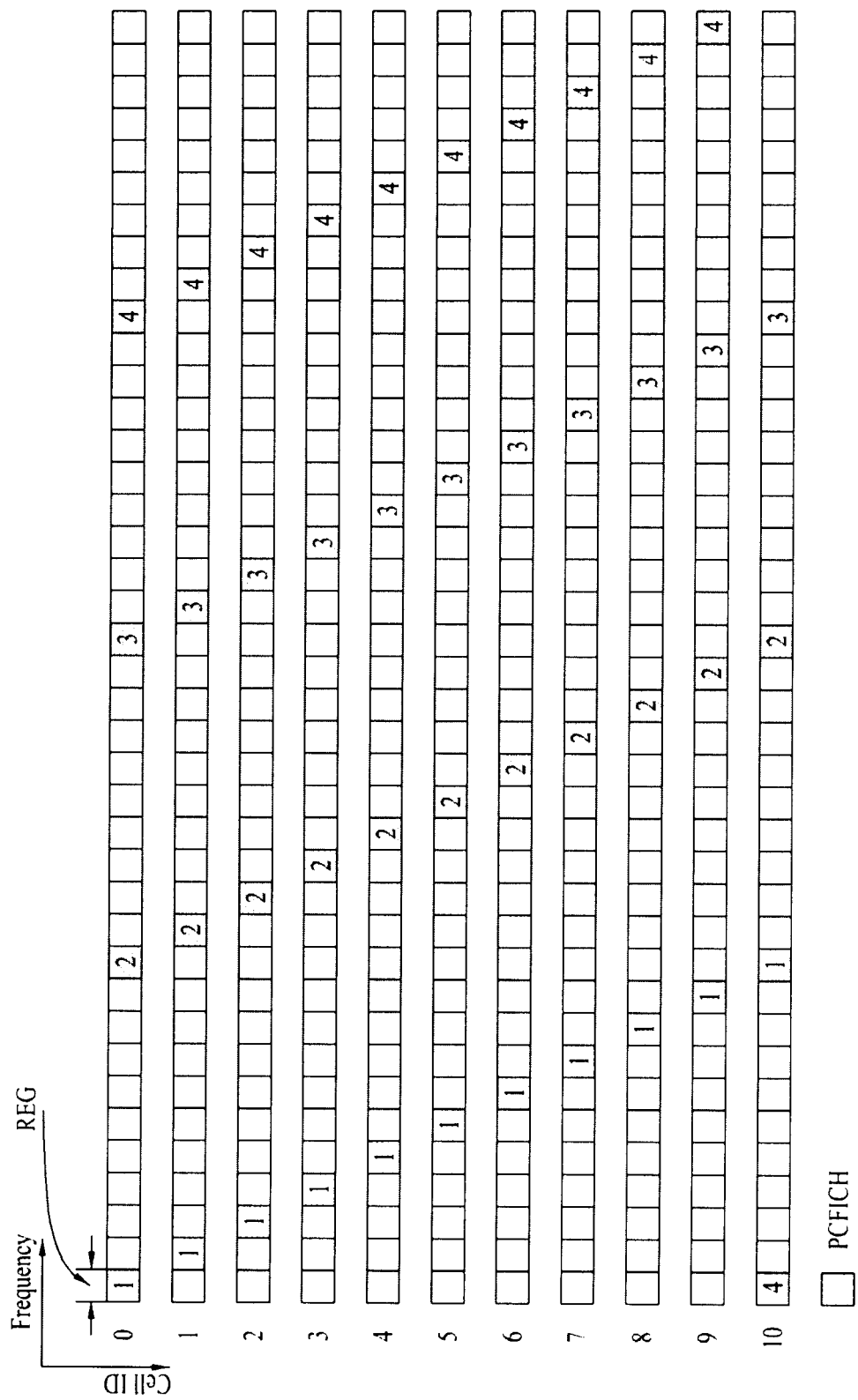
FIG. 8 illustrates an exemplary transmission of a Physical Control Format Indicator Channel (PCFICH) among control channels which may be used in embodiments of the present invention.

FIG. 8 illustrates an exemplary transmission of a PCFICH among control channels which may be used in embodiments of the present invention.

As is implied from its appellation, the PCFICH is a physical control format indicator channel indicating the number of OFDM symbols used for a PDCCH in every subframe to a UE. The PCFICH is positioned in the first OFDM symbol of the subframe. The PCFICH includes four REGs that are distributed across the control region according to a cell ID. One REF includes four REs. The PCFICH should be transmitted in every subframe, having a value ranging from 1 to 3. The PCFICH is modulated in 16 Quadrature Phase Shift Keying (16 QPSK).

TABLE 2 illustrates a Control Format Indicator (CFI) transmitted on the PCFICH.

| CFI | CFI codeword<br>$<b_0, b_1, \ldots, b_{31}>$ |
|---|---|
| 1 | <0,1,1,0,1,1,0,1,1,0,1,1,0,1,1,0,1,1,0,1,1,0,1,1,0,1,1,0,1,1,0,1> |
| 2 | <1,0,1,1,0,1,1,0,1,1,0,1,1,0,1,1,0,1,1,0,1,1,0,1,1,0,1,1,0,1,1,0> |
| 3 | <1,1,0,1,1,0,1,1,0,1,1,0,1,1,0,1,1,0,1,1,0,1,1,0,1,1,0,1,1,0,1,1> |
| 4<br>(Re-sersved) | <0,0,0,0,0,0,0,0,0,0,0,0,0,0,0,0,0,0,0,0,0,0,0,0,0,0,0,0,0,0,0,0> |

Referring to [Table 2], if the CFI is 1, this implies that the PDCCH is transmitted in OFDM symbol 0. If the CFI is 2 or 3, this implies that the PDCCH is transmitted in OFDM symbols 0 and 1 or in OFDM symbols 0, 1, and 2.

It is obvious that the CFI values listed in [Table 2] may be defined differently according to a bandwidth. For example, if a system bandwidth is narrower than a predetermined threshold, CFI values of 1, 2 and 3 indicate that the PDCCH may be used in 2, 3, and 4 OFDM symbols, respectively.

In FIG. 8, an REG includes four subcarriers. The REGs of the PCFICH include only data subcarriers except for RSs. In general, transmit diversity applies to the REGs of the PCFICH. In addition, the REGs of the PCFICH are frequency-shifted to avoid inter-cell interference. Since the PCFICH is always transmitted in the first OFDM symbol of a subframe, a UE or a receiver first acquires information of the PCFICH and then receives information of the PDCCH based on the PCFICH, when decoding each subframe.

Figure 9:
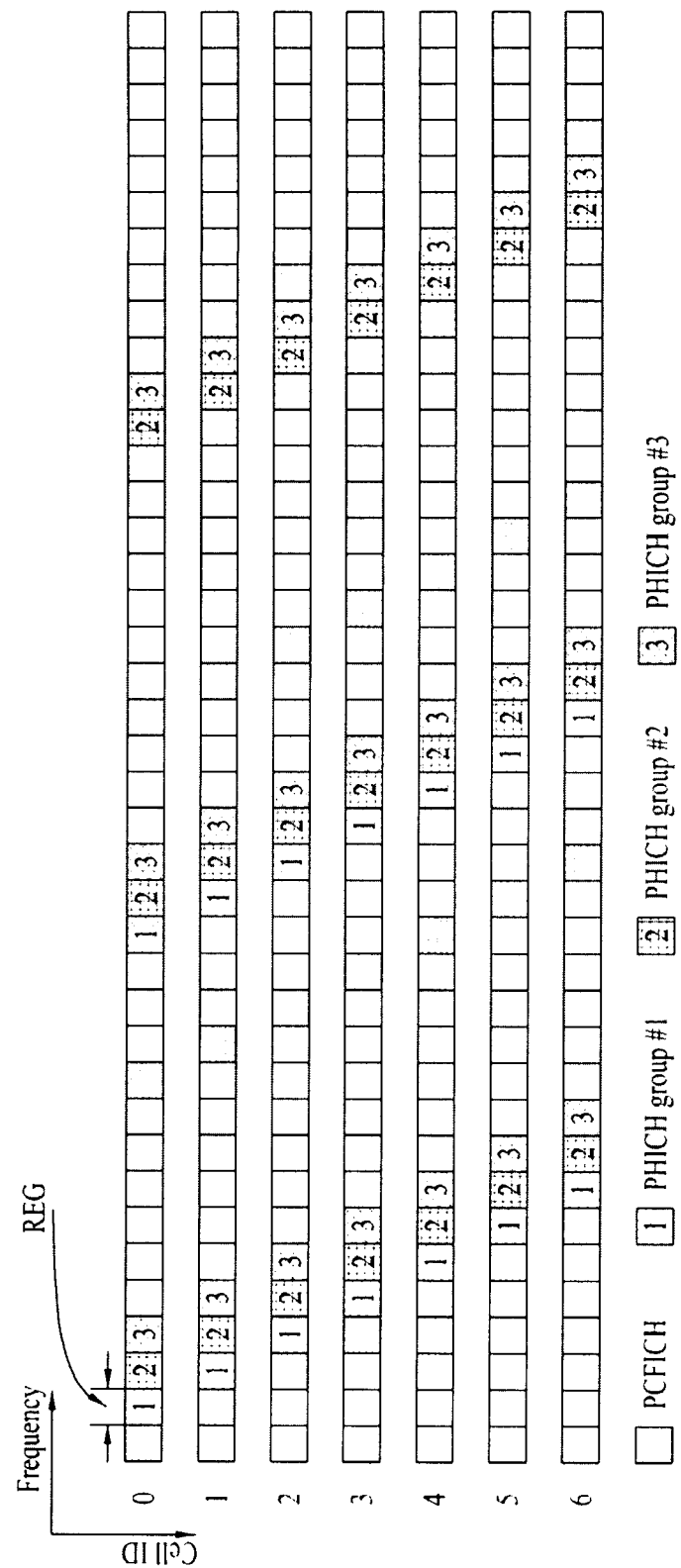
FIG. 9 illustrates an exemplary transmission of Physical Hybrid ARQ Indicator Channels (PHICHs) among control channels which may be used in embodiments of the present invention.

FIG. 9 illustrates an exemplary transmission of PHICHs among control channels which may be used in embodiments of the present invention.

A PHICH carries HARQ ACK/NACK information in response to a UL data transmission. The PHICH includes three REGs and is scrambled cell-specifically. ACK/NACK information is one bit, which is spread with a Spreading Factor (SF) of 4 and repeated three times. A plurality of PHICHs may be mapped to the same resources. The PHICH is modulated in Binary Phase Shift Keying (BPSK).

FIG. 9 illustrates the allocation positions of a PCFICH and PHICHs in a specific bandwidth. The PHICHs carry ACK/NACK information in response to UL data channels. A plurality of PHICH groups are defined in one subframe and a plurality of PHICHs may be included in a PHICH group. Accordingly, PHICH channels for a plurality of UEs are included in the PHICH group.

In FIG. 9, a PHICH for each UE in the plurality of PHICH groups is allocated according to a lowest Physical RB (PRB) index of a PUSCH resource allocation and a Demodulation RS (DMRS) cyclic shift indicated by a UL grant. PHICH resources are indicated by an index pair such as $(n_{PHICH}^{group}, n_{PHICH}^{seq})$. In the index pair $(n_{PHICH}^{group}, n_{PHICH}^{seq})$, $n_{PHICH}^{group}$ is a PHICH group number and $n_{PHICH}^{seq}$ is an orthogonal sequence index in a corresponding PHICH group. The current 3GPP LTE system uses orthogonal sequences listed in [Table 3].

TABLE 3

| Sequence index<br>$n_{PHICH}^{seq}$ | Orthogonal sequence | |
|---|---|---|
| | Normal CP<br>$N_{SF}^{PHICH} = 4$ | Extended CP<br>$N_{SF}^{PHICH} = 2$ |
| 0 | [+1 +1 +1 +1] | [+1 +1] |
| 1 | [+1 −1 +1 −1] | [+1 −1] |

TABLE 3-continued

| | Orthogonal sequence | |
|---|---|---|
| Sequence index $n_{PHICH}^{seq}$ | Normal CP $N_{SF}^{PHICH} = 4$ | Extended CP $N_{SF}^{PHICH} = 2$ |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

The following [Equation 1] illustrates a method for determining REs included in an index pair indicating PHICH resources.

$$n_{PHICH}^{group} = (I_{PRB\_RA}^{lowest\_index} + n_{DMRS}) \bmod N_{PHICH}^{group}$$

$$n_{PHICH}^{group} = (\lfloor I_{PRB\_RA}^{lowest\_index}/N_{PHICH}^{group} \rfloor + n_{DMRS}) \bmod 2N_{SF}^{PHICH}$$ [Equation 1]

where $n_{DMRS}$ is a cyclic shift value for DMRSs used in PHICH-related UL transmission, $N_{SF}^{PHICH}$ an SF used for an PHICH, $I_{PRB\_RA}^{lowest\_index}$ is a lowest PRB index of a UL resource allocation, and $N_{PHICH}^{group}$ is the number of configured PHICH groups.

$N_{PHICH}^{group}$ in [Equation 1] is the number of PHICH groups, calculated by [Equation 2].

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

where $N_g$ is information related to the amount of PHICH resources, expressed in 2 bits transmitted on a PBCH ($N_g \in \{1/6, 1/2, 1, 2\}$). In addition, a PHICH group may occupy different time areas in a subframe according to a PHICH duration.

FIG. 10 illustrates resources units used to configure a control channel according to embodiments of the present invention.

FIG. 10(a) illustrates a case of 1 or 2 Tx antennas and FIG. 10(b) illustrates a case of 4 Tx antennas. Resource units related to a control channel are configured in the same manner, although a different CRS pattern is used according to the number of Tx antennas. Referring to FIGS. 10(a) and 10(b), a resource unit for a control channel is an REG. The REG includes four adjacent REs except for CRSs. REGs are marked with bold lines in FIGS. 10(a) and 10(b). A PFICH and a PHICH are composed of 4 REGs and 3 REGs, respectively. A PDCCH is configured in CCEs, each CCE including 9 REGs. While the 9 REGs of a CCE are shown as successive, the REGs may be distributed.

Figure 11:
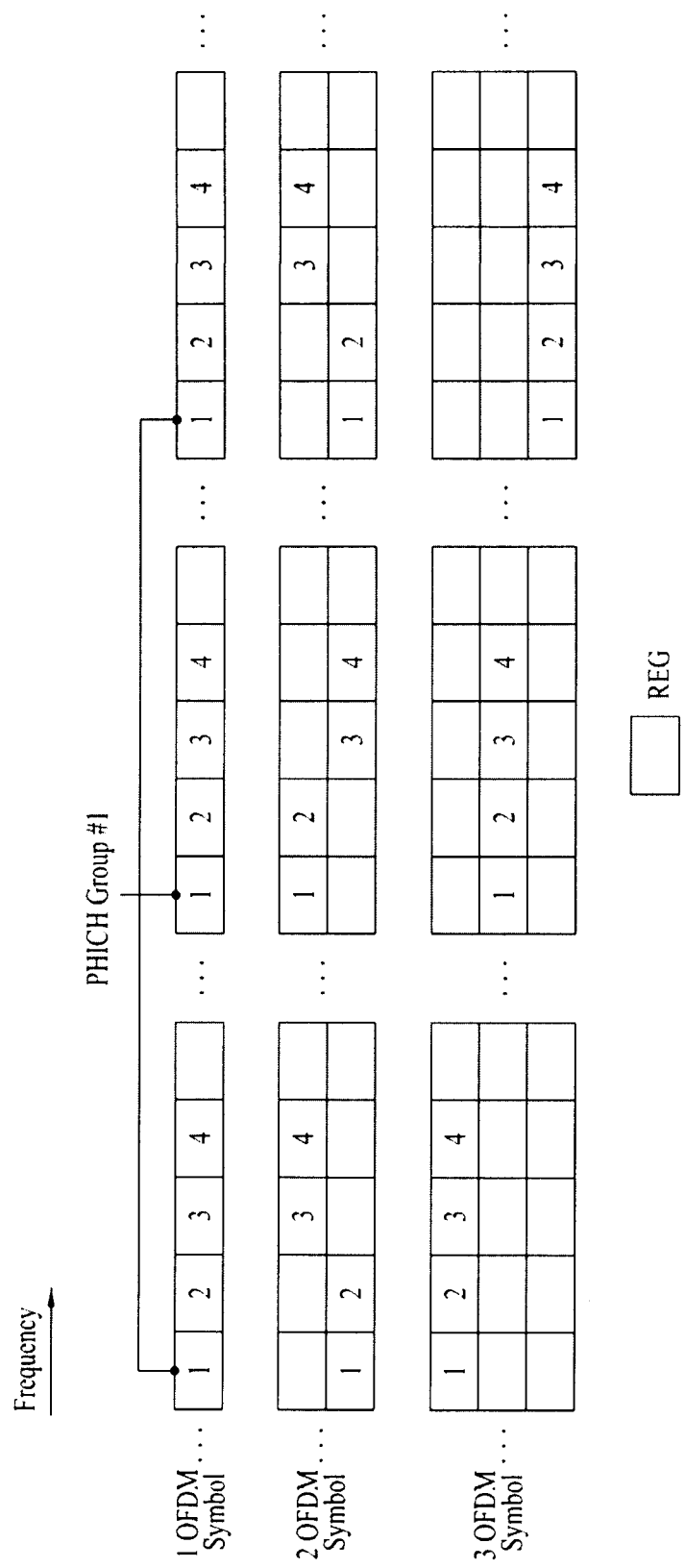
FIG. 11 illustrates an exemplary allocation of PHICHs to a control region according to embodiments of the present invention.

FIG. 11 illustrates an exemplary allocation of PHICHs to a control region according to embodiments of the present invention.

PHICH allocation is affected by a PCFICH. Although the PCFICH starts at a different position according to a cell ID as illustrated in [Table 1], the PCFICH is transmitted in 4 REGs spaced equidistantly from one another by dividing the total subcarriers of the first OFDM symbol by 4. A PHICH is defined in the remaining REGs after the PCFICH is allocated. PHICH groups are allocated successively at a specific starting position by dividing the remaining REGs except for REGs allocated to RSs and the PCFICH (the first OFDM symbol) by 3 in each of one or more OFDM symbols configured during a PHICH duration.

Referring to FIG. 11, three PHICH allocation areas are defined in the frequency domain and PHICH groups are successively allocated to each of the PHICH allocation areas. In FIG. 11, the same reference numeral denotes the same PHICH group. The PHICH duration is limited by a maximum size of a control region. The PHICH duration is 1 to 3 OFDM symbols. If a plurality of OFDM symbols are allocated to a PHICH, the REGs of the same PHICH group are transmitted in different OFDM symbols to achieve transmit diversity.

Referring to FIG. 4 again, a PDCCH is a physical downlink control channel allocated to the first n OFDM symbols of a subframe. Herein, n is 1 or a larger integer indicated by a PCFICH and n=1, 2, and 3. The PDCCH is allocated in CCEs, each CCE including 9 REGs. The PDCCH delivers resource allocation information about transport channels, Paging Channel (PCH) and DL-SCH, a UL grant, HARQ information, etc.

The PCH and the DL-SCH are transmitted on a PDSCH. Therefore, an eNB and a UE transmit and receive data on the PDSCH except for a specific control signal or specific service data. Information indicating one or more UEs to receive PDSCH data and information indicating how the UEs are supposed to receive and decode the PDSCH data are delivered on a PDCCH.

For example, on the assumption that the CRC of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, one or more UEs within a cell monitor a PDCCH using their RNTI information. If one or more UEs have RNTI "A", these UEs receive the PDCCH and receive a PDSCH indicated by "B" and "C" based on information of the received PDCCH.

2. UL Structure in 3GPP LTE-A System

Compared to DL signal transmission from an eNB, a Peak-to-Average Power Ratio (PAPR) becomes a problem with UL signal transmission from a UE in a wireless communication system. Therefore, a UL signal is transmitted in SC-FDMA, while a DL signal is transmitted in OFDMA in the LTE/LTE-A system.

Figure 12:
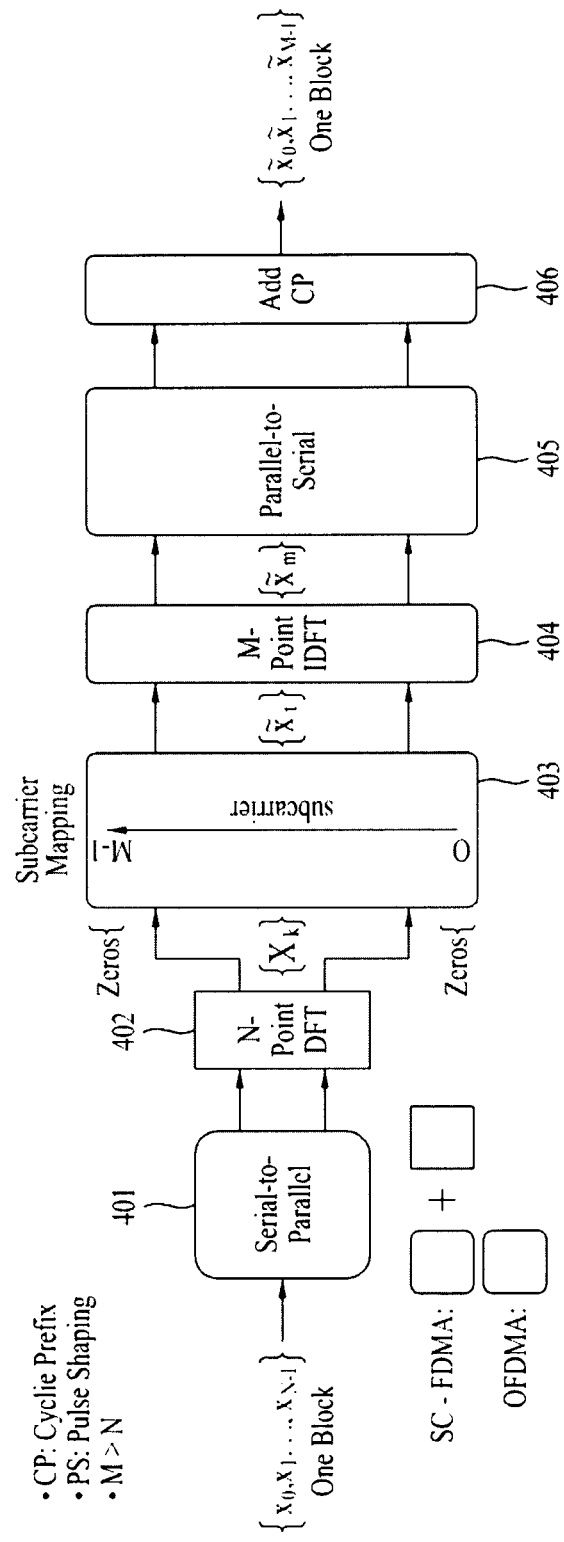
FIG. 12 illustrates a configuration of a User Equipment (UE) and Single Carrier Frequency Division Multiple Access (SC-FDMA) and Orthogonal Frequency Division Multiple Access (OFDMA) schemes, which may be used in embodiments of the present invention.

FIG. 12 illustrates a configuration of a UE and SC-FDMA and OFDMA schemes, which may be used in embodiments of the present invention.

A 3GPP system (e.g. the LTE system) adopts OFDMA for DL and SC-FDMA for UL. Referring to FIG. 12, a UE and an eNB are common in that each of the UE and the eNB has a serial-to-parallel converter 1201, a subcarrier mapper 1203, an M-point Inverse Discrete Fourier Transform (IDFT) module 1204, and a CP adding module 1206 in order to transmit a UL signal or a DL signal.

To transmit a signal in SC-FDMA, the UE further includes an N-point Discrete Fourier Transform (DFT) module 1202. The N-point DFT module 1202 nullifies the effects of IDFT of the IDFT module 1204 to some extent so that the transmission signal takes a single carrier property.

FIG. 13 illustrates frequency-domain signal mapping methods that satisfy the single carrier property in the frequency domain, which may be used in embodiments of the present invention.

FIG. 13(a) illustrates a localized mapping scheme and FIG. 13(b) illustrates a distributed mapping scheme. In clustered SC-FDMA being a modification of SC-FDMA, DFT output samples are divided into sub-groups and mapped to the frequency domain (or a subcarrier domain) non-continuously during subcarrier mapping.

FIG. 14 is a block diagram illustrating transmission of an RS for use in demodulating a signal transmitted in SC-FDMA.

According to an LTE standard (e.g. 3GPP release 8), while a time signal of data is converted to a frequency signal by DFT, mapped to subcarriers, Inverse Fast Fourier Transform (IFFT)-processed, and then transmitted (refer to FIG. 12), an RS is generated directly in the frequency domain without DFT processing (S1410), mapped to subcarriers (S1420), IFFT-processed (S1430), attached with a CP (S1440), and then transmitted.

FIG. 15 illustrates the positions of symbols to which RSs are mapped in an SC-FDMA subframe structure.

FIG. 15(a) illustrates a case where RSs are positioned in the fourth SC-FDMA symbol of each of two slots in a subframe, when a normal CP is used. FIG. 15(b) illustrates a case where RSs are positioned in the third SC-FDMA symbol of each of two slots in a subframe, when an extended CP is used.

Figure 16:
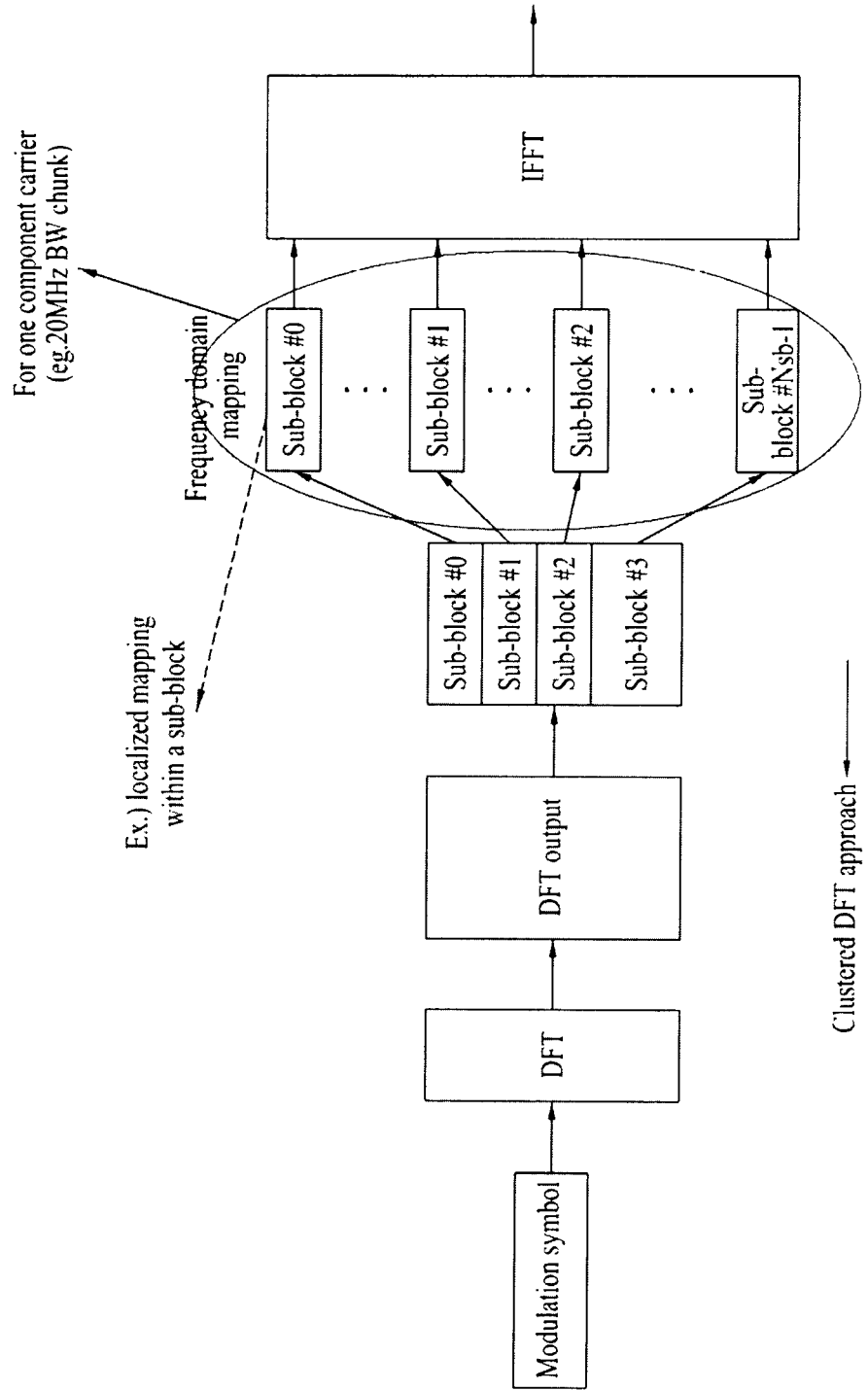
FIG. 16 illustrates a signal processing operation for mapping Discrete Fourier Transform (DFT) output samples to a single carrier in clustered SC-FDMA.
Figure 17:
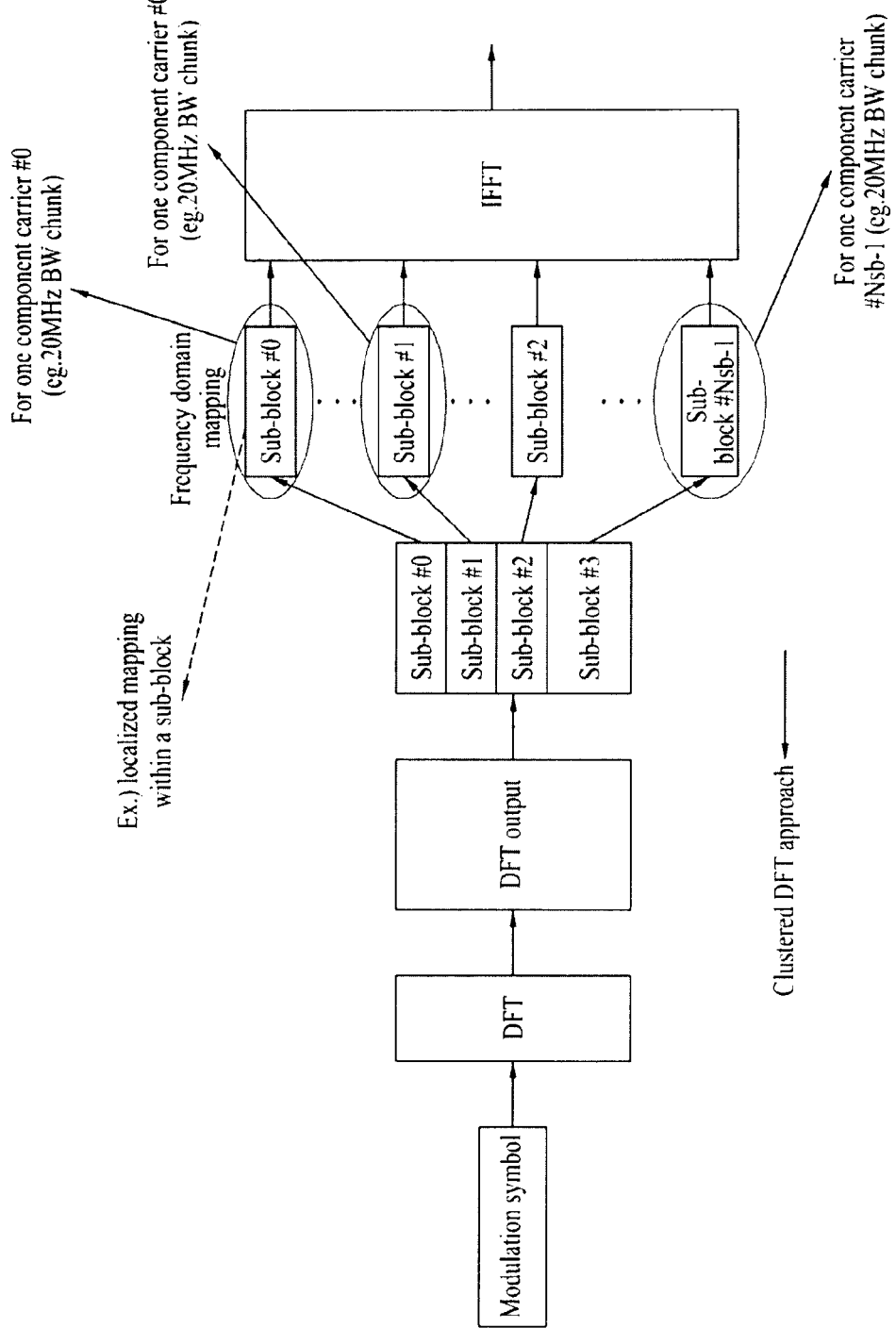
FIGS. 17 and 18 illustrate signal processing operations for mapping DFT output samples to multiple carriers in clustered SC-FDMA.
Figure 18:
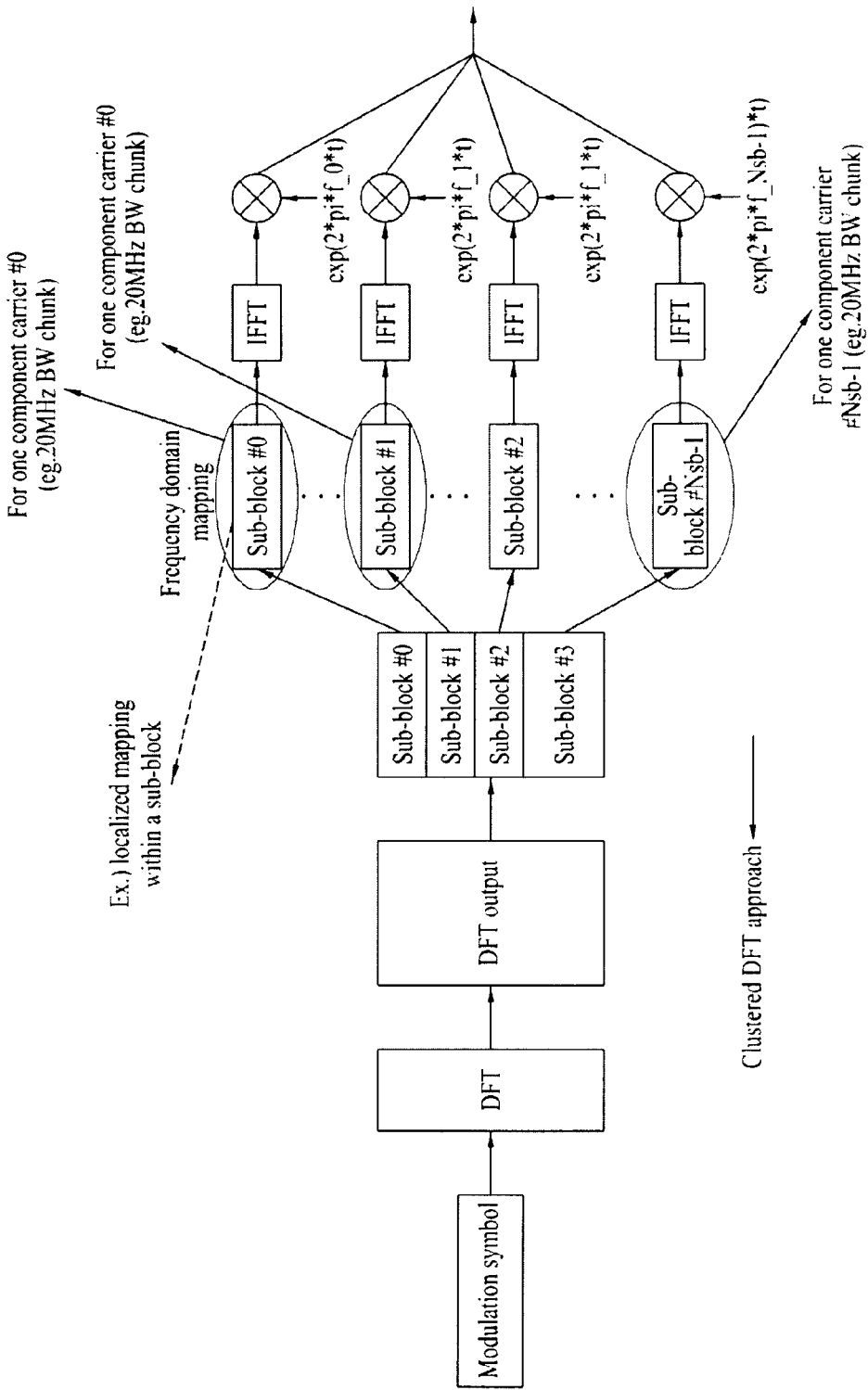

FIG. 16 illustrates a signal processing operation for mapping DFT output samples to a single carrier in clustered SC-FDMA. FIGS. 17 and 18 illustrate signal processing operations for mapping DFT output samples to multiple carriers in clustered SC-FDMA.

FIG. 16 illustrates an example of intra-carrier clustered SC-FDMA and FIGS. 17 and 18 illustrate examples of inter-carrier SC-FDMA. In FIG. 17, with contiguous CCs allocated in the frequency domain, if a subcarrier spacing is aligned between adjacent CCs, a signal is generated from a single IFFT block. In FIG. 18, with non-contiguous CCs allocated in the frequency domain, signals are generated from a plurality of IFFT blocks.

Figure 19:
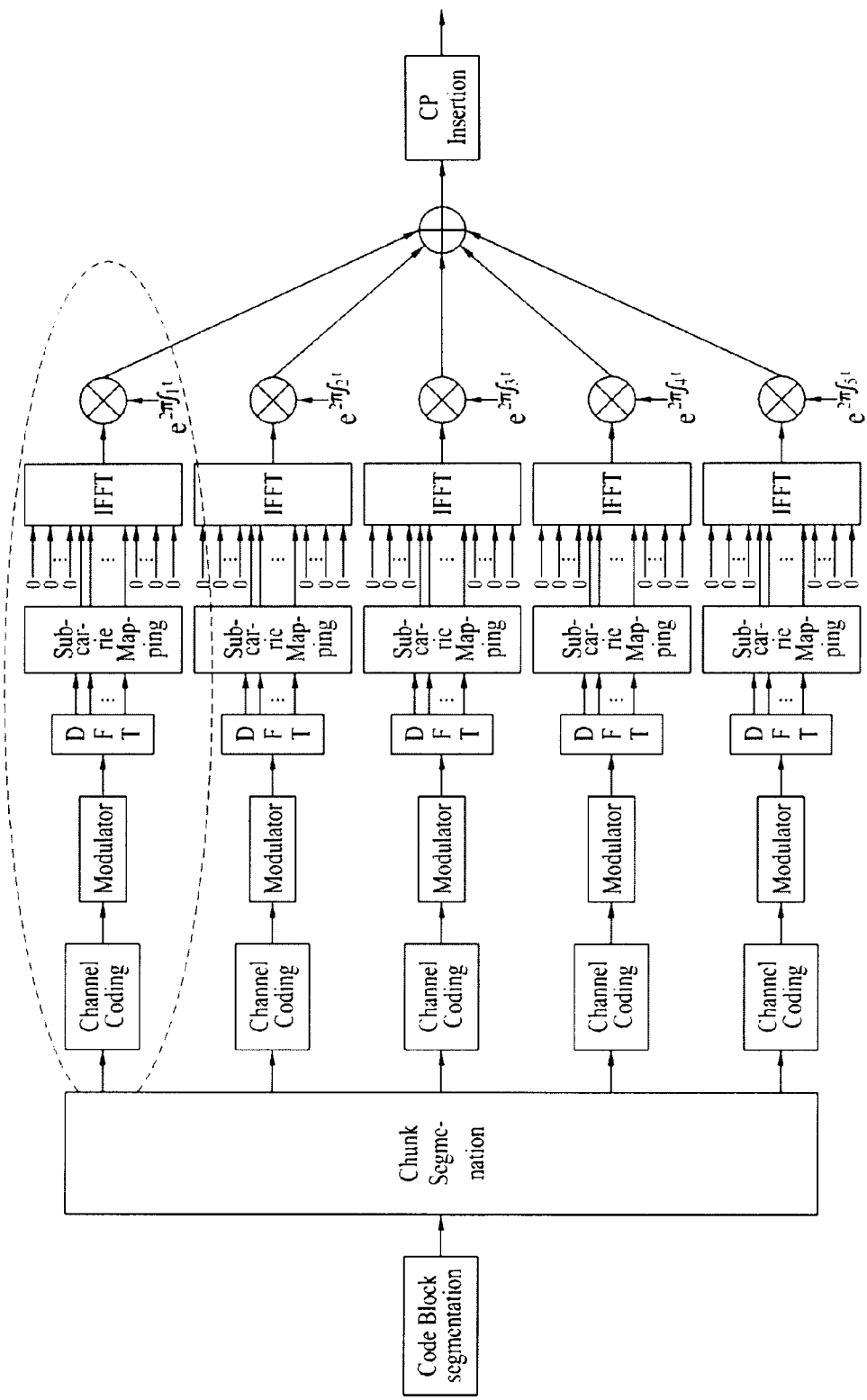
FIG. 19 illustrates a signal processing operation in segmented SC-FDMA.

FIG. 19 illustrates a segmented SC-FDMA signal processing operation.

In segmented SC-FDMA, as many IFFT modules as the number of DFT modules are used. Since DFT modules are mapped to IFFT modules in a one-to-one correspondence, segmented SC-FDMA is an extension of the DFT spreading and IFFT frequency subcarrier mapping configuration of the legacy SC-FDMA, also referred to as NxSC-FDMA or NxDFT-s-OFDMA. Herein, NxSC-FDMA and NxDFT-s-OFDMA are uniformly called segmented SC-FDMA. Referring to FIG. 19, to relieve the single carrier property constraint, total time-domain modulation symbols are grouped into N groups (N is an integer larger than 1) and DFT-processed on a group basis in segmented SC-FDMA.

3. Multi-Carrier Aggregation Environment

Communication environments considered in embodiments of the present invention include a multi-carrier environment. That is, a multi-carrier system or a multi-carrier aggregation system refers to a system that aggregates one or more Component Carriers (CCs) each having a smaller bandwidth than a target bandwidth in order to support a broad band in the present invention.

In the present invention, multi-carrier means Carrier Aggregation (CA) (or carrier combining). CA covers aggregation of non-contiguous carriers as well as aggregation of contiguous carriers. The term CA is interchangeably used with carrier combining, bandwidth combining, etc.

The LTE-A system aims to support a bandwidth of up to 100 MHz by use of multi-carriers (i.e. CA) configured by aggregating two or more CCs. To guarantee backward compatibility with a legacy IMT system, each of one or more carriers, which has a smaller bandwidth than a target bandwidth, may be limited to a bandwidth used in the legacy system.

For example, the legacy 3GPP LTE system supports bandwidths {1.4, 3, 5, 10, 15, and 20 MHz} and the 3GPP LTE-A system may support a broader bandwidth than 20 MHz using these LTE bandwidths. A multi-carrier system of the present invention may support carrier combining (i.e. CA) by defining a new bandwidth irrespective of the bandwidths used in the legacy system.

The LTE-A system adopts the concept of cell to manage radio resources. A cell is defined by combining DL and UL resources, although the UL resources are not a necessity. Accordingly, a cell may be configured with DL resources alone or both DL and UL resources. If multiple carriers (i.e. carrier combining or CA) are supported, the linkage between the carrier frequencies of DL resources (or DL CCs) and the carrier frequencies of UL resources (or UL CCs) may be indicated by a System Information Block (SIB).

In the LTE-A system, a Primacy Cell (PCell) and a Secondary Cell (SCell) are defined. A PCell refers to a cell operating in a primary frequency (e.g. a Primary CC (PCC)) and an SCell refers to a cell operating in a secondary frequency (a Secondary CC (SCC)). Only one PCell and one or more SCells may be allocated to a specific UE.

The UE uses the PCell for initial connection establishment or connection reestablishment. The PCell may be a cell indicated as a PCell during handover. An SCell may be configured after RRC connection establishment and may be used to provide additional radio resources.

A PCell and an SCell may be used as serving cells. If the UE is in RRC_CONNECTED state but CA has not been configured or is not supported in the UE, only one serving cell being a PCell exists for the UE. On the other hand, if the UE is in RRC_CONNECTED state and CA has been configured for the UE, one or more serving cells may exist for the UE. The total serving cells include a PCell and one or more SCells.

After an initial security activation procedure starts, an E-UTRAN may configure a network including one or more SCells by adding them to a PCell initially configured during connection establishment. In a multi-carrier environment, each of a PCell and an SCell may operate as a CC. That is, CA may be regarded as combining a PCell with one or more SCells. Hereinbelow, a PCC may be used interchangeably with a PCell in the same meaning and an SCC may be used interchangeably with an SCell in the same meaning.

4. Enhanced Physical Downlink Control Channel (E-PDCCH)

Now, a detailed description will be given of E-PDCCH. Since two or more cells are aggregated and an unprecedented terminal type (e.g. a Device to Device (D2D) terminal, etc.) is used in a CA environment, more control information than in a radio environment using only a single cell is to be transmitted or received. Since the LTE-A system supports Multi-User Multiple Input and Multiple Output (MU-MIMO) and Coordinated Multi-Point (CoMP), PDCCH (hereinafter, referred to as legacy PDCCH) configured for up to Rel-10 may be insufficient. To satisfy this demand, another PDCCH is needed in addition to the legacy PDCCH. That is, the additional PDCCH serves a different usage from that of the legacy PDCCH in the LTE-A system (e.g., Rel-11). Accordingly, PDCCH, PDSCH, and UEs in the legacy LTE system (e.g., Rel-8, Rel-9, or Rel-10) are referred to as legacy PDCCH, legacy PDSCH, and legacy UEs, respectively and an additional PDCCH and an additional PDSCH used in the LTE-A system (e.g., Rel-11) are referred to as E-PDCCH and Enhanced PDSCH (E-PDSCH), respectively.

To increase a PDCCH capacity, MIMO transmission or high-order modulation such as 16QAM may be performed in a legacy PDCCH region. However, these methods perform poorly, compared to the legacy PDCCH. Recently, various methods for allocating resources of a PDSCH region to an E-PDCCH are under discussion to overcome the lack of the PDCCH capacity.

4.1 Subframe Structure with E-PDCCH-1

FIG. 20 illustrates exemplary subframe structures each including an E-PDCCH according to an embodiment of the present invention.

FIG. 20(a) illustrates an E-PDCCH configured in Time Division Multiplexing (TDM) so that a few symbols following a legacy PDCCH may be used as an E-PDCCH region. Most of formats defined for the legacy PDCCH are applicable to the TDM E-PDCCH. In addition, the TDM E-PDCCH decreases a decoding delay and enables micro sleep from the perspective of a UE. However, since the E-PDCCH uses a legacy PDSCH region, the E-PDCCH may cause problems to operations of UEs conforming to up to LTE-A Rel-10.

FIG. 20(b) illustrates an E-PDCCH configured in Frequency Division Multiplexing (FDM) so that a total area of specific subcarriers following a legacy PDCCH may be used for the E-PDCCH. The FDM E-PDCCH does not adversely affect the operations of UEs conforming to up to LTE-A Rel-10. Compared to the TDM E-PDCCH, the FDM E-PDCCH may be transmitted based on DMRS and thus UE-specifically. Despite these advantages, the FDM E-PDCCH increases the decoding delay of a PDSCH and does not allow micro sleep from the perspective of a UE. As a result, the power consumption of the UE is increased. In the case of UE-specific transmission of an FDM E-PDCCH, an entire PRB or an entire slot allocated to the FDM E-PDCCH should be allocated to the UE, thereby reducing resource efficiency.

Accordingly, the present invention proposes an E-PDCCH that decreases the power consumption of a UE and a decoding delay and is excellent in terms of resource efficiency, without affecting a legacy UE (e.g., an LTE-A Rel-8/9/10 UE).

Figure 21:
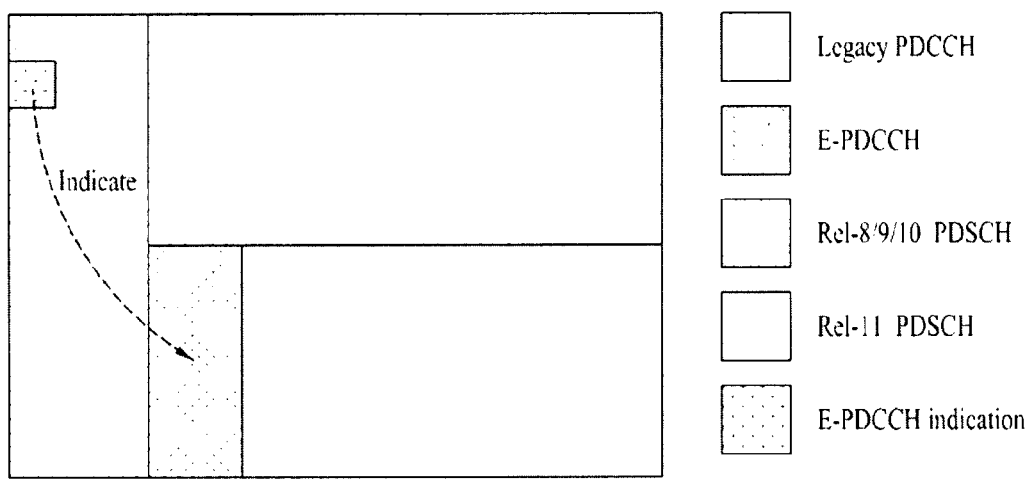
FIG. 21 illustrates an exemplary subframe structure including an E-PDCCH according to another embodiment of the present invention.

FIG. 21 illustrates an exemplary subframe structure including an E-PDCCH according to another embodiment of the present invention.

Referring to FIG. 21, a horizontal axis represents symbols in the time domain and a vertical axis represents subcarriers in the frequency domain. A DL subframe includes two slots. The first, second, and third symbols of the first slot are a control region to which a legacy PDCCH may be allocated and the fourth and following symbols are a PDSCH region carrying DL data.

According to the present invention, a legacy PDSCH region may be divided into a legacy PDSCH (Rel-8/9/10 PDSCH) region and an Enhanced PSCH (E-PDSCH) region to provide an E-PDCCH to UEs conforming to Rel-11 and beyond, without affecting the structure of a legacy PDCCH. Therefore, a legacy UE may receive DL data in the legacy PDSCH region and a Rel-11 UE may receive DL data in the Rel-11 PDSCH region (i.e., the E-PDSCH region). In addition, a control signal may be transmitted to the Rel-11 UE without affecting the legacy UE by designing a subframe in such a manner that the E-PDCCH region is allocated only to the E-PDSCH region, not to the legacy PDSCH region.

An E-PDCCH indication signal including information indicating whether an E-PDCCH is transmitted and information about an allocation area of the E-PDCCH may be transmitted to a UE in a control region to which a legacy PDCCH is allocated. The Rel-11 UE may receive the E-PDCCH in the E-PDSCH region indicated by the E-PDCCH indication signal.

Figure 22:
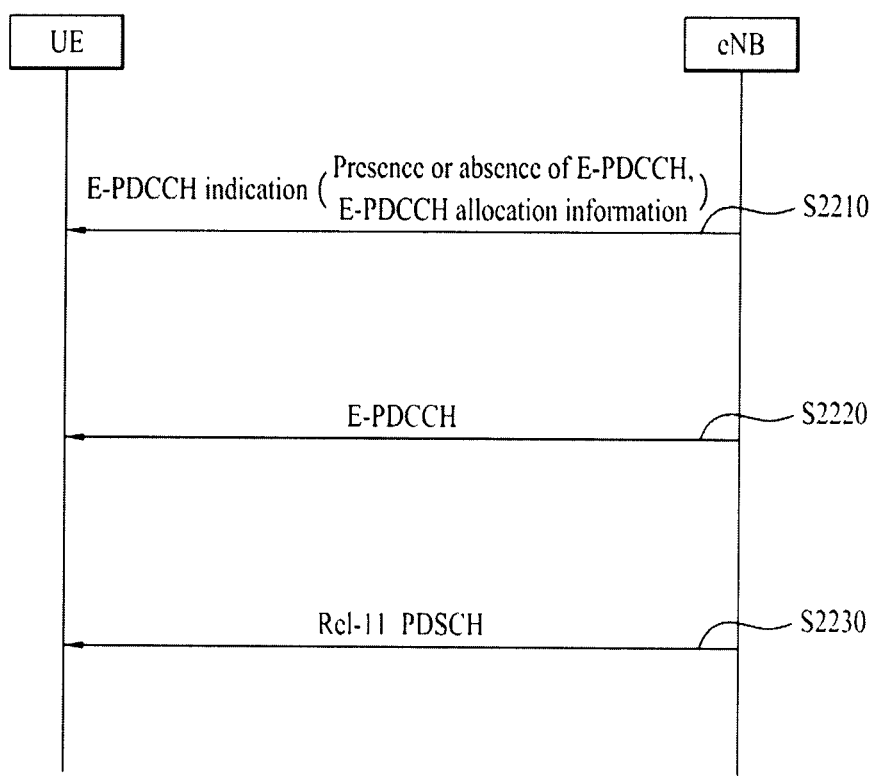
FIG. 22 illustrates a method for allocating an E-PDCCH according to an embodiment of the present invention.

FIG. 22 illustrates a method for allocating an E-PDCCH according to an embodiment of the present invention.

Referring to FIG. 22, an eNB may transmit an E-PDCCH indication signal to a Rel-11 UE. The E-PDCCH indication signal may include at least one of a parameter (or a field) indicating whether an E-PDCCH is delivered in a current subframe and E-PDCCH allocation information indicating a resource region to which the E-PDCCH is allocated (S2210).

If radio resources allocated to the E-PDCCH are contiguous in the frequency domain, the E-PDCCH allocation information may include the starting and ending indexes of the E-PDCCH region in the frequency domain and the number of symbols used in the time domain.

In an aspect of the present invention, the E-PDCCH indication signal may be transmitted in a Common Search Space (CSS) so that all UEs within a cell of the eNB may decode the E-PDCCH indication signal in step S2210. Although a legacy PDCCH signal is typically transmitted in Control Channel Elements (CCEs), the E-PDCCH indication signal may be transmitted in REs or REGs.

In another aspect of the present invention, the E-PDCCH indication signal may be transmitted in a UE-specific Search Space (USS) so that only a specific UE may decode the E-PDCCH indication signal in step S2210. In this case, the eNB may transmit the E-PDCCH signal only to a Rel-11 UE.

In another aspect of the present invention, the E-PDCCH indication signal may be disposed at the start of a legacy PDCCH region in step S2210. For example, the E-PDCCH indication signal may be delivered in the first CCE. In this case, the Rel-11 UE does not need to decode the entire legacy PDCCH region to receive the E-PDCCH indication signal, whereas the legacy UE performs blind decoding after the first CCE in order to receive a PDCCH signal, thereby reducing the overhead of blind decoding.

The Rel-11 UE may determine whether an E-PDCCH exists and the position of the E-PDCCH by receiving the E-PDCCH indication signal. Therefore, the Rel-11 UE may receive the E-PDCCH in a resource region indicated by the E-PDCCH allocation information (S2220).

Further, the Rel-11 UE may detect control information about an E-PDSCH allocated to the Rel-11 UE by receiving the E-PDCCH signal. Thus, the Rel-11 UE may receive DL data in an E-PDSCH region indicated by the E-PDCCH signal (S2230).

Figure 23:
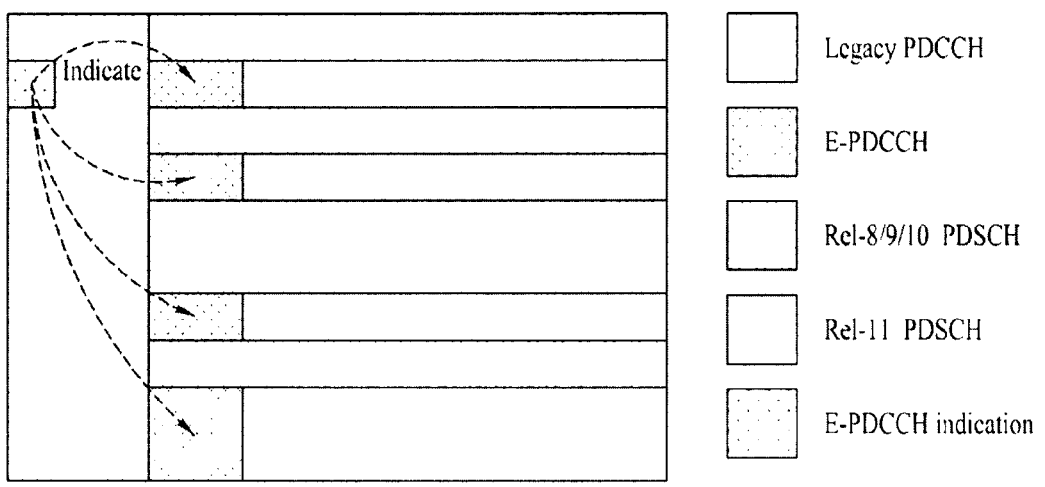
FIG. 23 illustrates an exemplary subframe structure including an E-PDCCH according to another embodiment of the present invention.

FIG. 23 illustrates an exemplary subframe structure including an E-PDCCH according to another embodiment of the present invention.

In FIG. 23, a horizontal axis represents symbols in the time domain and a vertical axis represents subcarriers in the frequency domain. Herein, a DL subframe includes two slots. The first, second, and third symbols of the first slot are a control region to which a legacy PDCCH may be allocated and the fourth and following symbols are a data region carrying DL data. An E-PDCCH is multiplexed with data in resources allocated to a UE in an E-PDSCH region and the size of the E-PDCCH is variable according to Quality of Service (QoS).

Referring to FIG. 23, a resource region allocated to an E-PDCCH may not be contiguous. In this case, E-PDCCH allocation information may include a frequency-domain index set of the resource region allocated to the E-PDCCH.

4.2 E-PDCCH Structure

In the embodiments of the present invention described before with reference to FIGS. 20 to 23, an E-PDCCH resource region may be configured based on CRS. In the case of CRS-based E-PDCCH transmission, only resources required for each UE may be allocated to an E-PDCCH independently of PDSCH allocation to the UE, in the same manner as done to a legacy PDCCH. For example, despite the absence of a PDSCH signal for a UE in a corresponding frequency band, an E-PDCCH may be allocated to the UE.

In this case, an E-PDCCH resource region may be allocated to each UE in CCEs, like the legacy PDCCH. Or unlike the legacy PDCCH, the E-PDCCH resource region may be allocated in REs or REGs, not in CCEs.

In another aspect, an E-PDCCH resource region may be configured based on DMRS in the embodiments of the present invention described with reference to FIGS. 20 to 23. In the case of DMRS-based E-PDCCH transmission, resources are preferably allocated to an E-PDCCH in conjunction with a PDSCH.

For example, an E-PDSCH for a UE may be allocated and transmitted to the UE in the same frequency band to which an E-PDCCH for the UE is allocated. In this case, an E-PDSCH resource region is allocated in PRBs and thus an E-PDCCH region is also allocated in PRBs.

4.3 Subframe Structure with E-PDCCH-2

Figure 24:
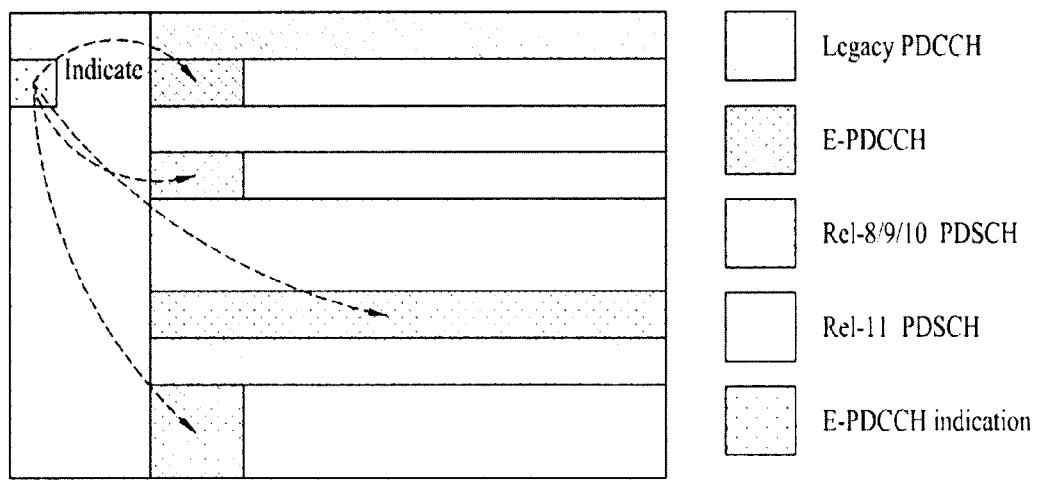
FIG. 24 illustrates an exemplary subframe structure including an E-PDCCH according to another embodiment of the present invention.

FIG. 24 illustrates an exemplary subframe structure including an E-PDCCH according to another embodiment of the present invention.

In FIG. 24, a horizontal axis represents symbols in the time domain and a vertical axis represents subcarriers in the frequency domain. A DL subframe includes two slots. The first, second, and third symbols of the first slot are a control region to which a legacy PDCCH may be allocated and the fourth and following symbols are a PDSCH region carrying DL data. An E-PDCCH is multiplexed with data in resources allocated to a UE in an E-PDSCH region and the size of the E-PDCCH is variable according to QoS.

The subframe structure illustrated in FIG. 24 may be used for a UE that receives only an E-PDCCH without a PDSCH. In this case, the E-PDCCH may occupy all symbols of a frequency band to which the E-PDCCH is allocated.

Figure 25:
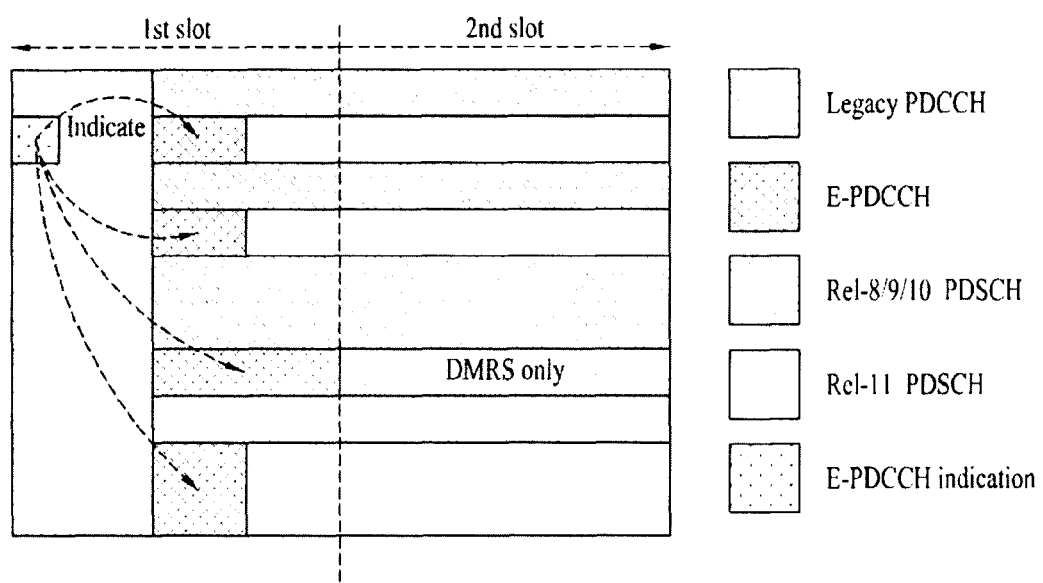
FIG. 25 illustrates an exemplary subframe structure including an E-PDCCH according to another embodiment of the present invention.

FIG. 25 illustrates an exemplary subframe structure including an E-PDCCH according to another embodiment of the present invention.

In FIG. 25, a horizontal axis represents symbols in the time domain and a vertical axis represents subcarriers in the frequency domain. A DL subframe includes two slots. The first, second, and third symbols of the first slot are a control region to which a legacy PDCCH may be allocated and the fourth and following symbols are a PDSCH region carrying DL data. An E-PDCCH is multiplexed with data in resources allocated to a UE in an E-PDSCH region and the size of the E-PDCCH is variable according to QoS.

The subframe structure illustrated in FIG. 25 may be used for a UE that receives only an E-PDCCH without a PDSCH. In the illustrated case of FIG. 25, only a DMRS may be allocated because an E-PDSCH is not transmitted. Herein, the E-PDCCH signal may be transmitted in the first slot and the DMRS may be transmitted in the second slot.

Figure 26:
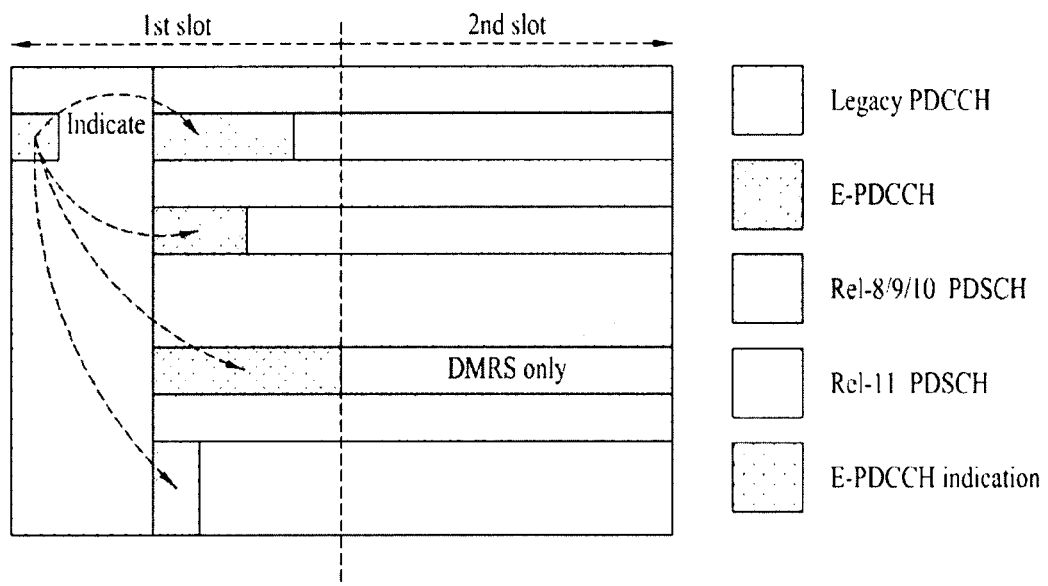
FIG. 26 illustrates an exemplary subframe structure including an E-PDCCH according to another embodiment of the present invention.

FIG. 26 illustrates an exemplary subframe structure including an E-PDCCH according to another embodiment of the present invention.

The subframe structure of FIG. 26 is basically similar to the subframe structure of FIG. 25, except that the resource size of an E-PDCCH region allocated to each UE is changed to satisfy the coding rate of an E-PDCCH and/or the QoS of the E-PDCCH in FIG. 26.

Figure 27:
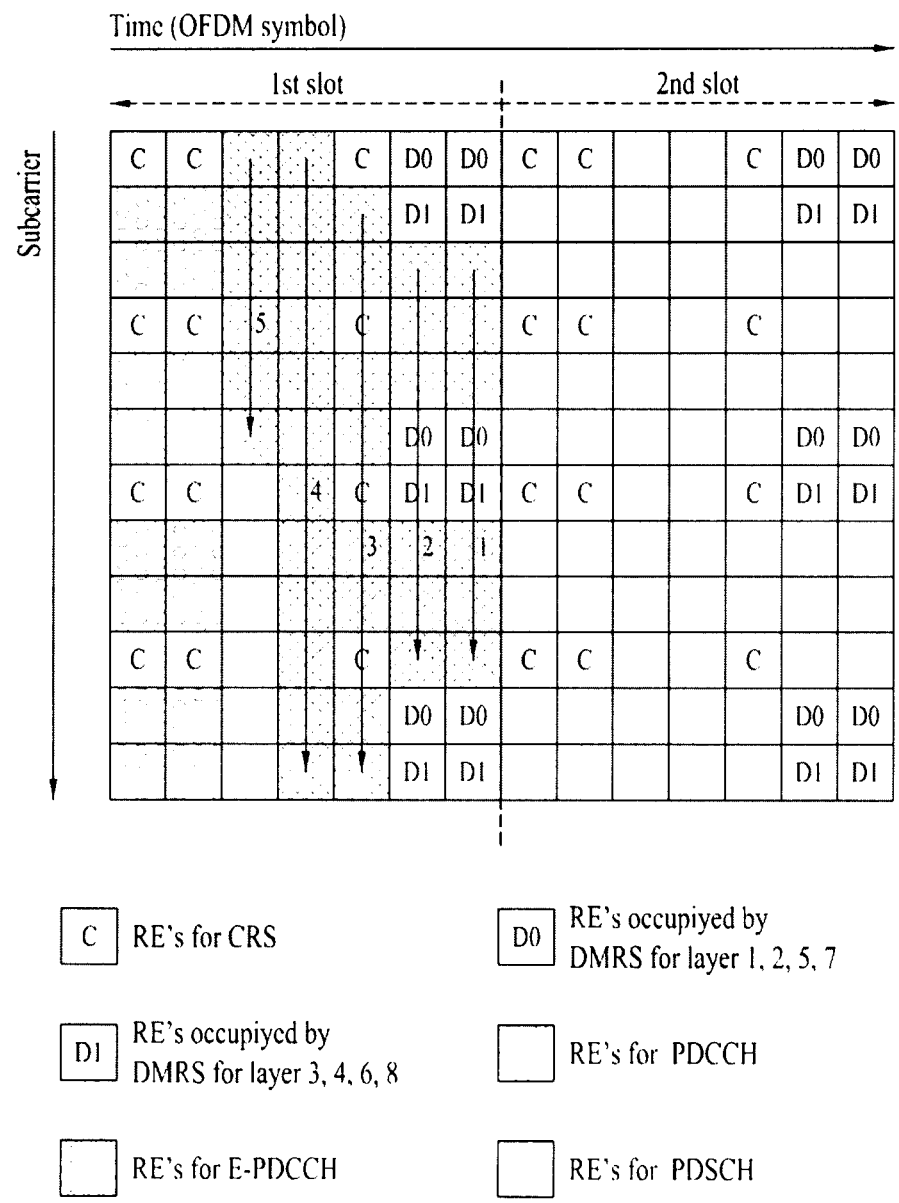
FIG. 27 illustrates a method for allocating an E-PDCCH according to another embodiment of the present invention.

FIG. 27 illustrates a method for allocating an E-PDCCH according to another embodiment of the present invention.

In FIG. 27, a horizontal axis represents OFDM symbols in the time domain and a vertical axis represents subcarriers in the frequency domain. A DL subframe includes two slots. The first, second, and third symbols of the first slot are a control region to which a legacy PDCCH may be allocated.

If a PDCCH is multiplexed with data in a DMRS-based manner, an E-PDCCH may be allocated by frequency-first mapping in reverse time order, starting from an OFDM symbol carrying the last DMRS in the first slot of a PRB allocated to a UE. For example, the E-PDCCH may be mapped to a resource region in the manner illustrated in FIG. 27. That is, (1) CRSs or DMRSs may be mapped to a resource region of a subframe, (2) a legacy PDCCH may be mapped to the resource region, and then (3) the E-PDCCH may be mapped to the remaining region.

In the case of UE-specific transmission of a DMRS-based DL subframe, a UE may receive all DMRSs in each slot of the subframe and then decode the slot. Accordingly, when the UE receives a UE-specific E-PDCCH signal in the first slot of the subframe, the UE may decode the first slot after receiving all DMRSs in the first slot.

Therefore, there is no time difference between decoding of an OFDM symbol without a DMRS and decoding of an OFDM symbol carrying a DMRS from the perspective of the UE. However, as the E-PDCCH is closer to a DMRS, channel estimation errors are reduced. Therefore, a channel signal may be transmitted more robustly in an OFDM symbol with a DMRS. In this context, since the QoS of an E-PDCCH should be higher than the QoS of a PDSCH data signal, the E-PDCCH signal is preferably located nearer to a DMRS.

In this case, the starting position of the E-PDCCH is advantageously determined irrespective of the number of legacy PDCCH symbols.

Referring to FIG. 27, the QoS of the E-PDCCH is not satisfied just by mapping the E-PDCCH to the first slot. In the presence of data to be transmitted on a PDSCH, the E-PDCCH may be confined to the first slot by increasing the size of the PRB allocated to the UE.

If only the E-PDCCH signal is transmitted (refer to FIG. 24), the entire PRB allocated to the UE may be allocated to the E-PDCCH. In this case, after the E-PDCCH is mapped to the first slot, the second slot may be left empty as illustrated in FIG. 27. Or after E-PDCCH data is mapped to the first slot, additional E-PDCCH data may be mapped to the second slot. Then, the eNB may transmit an indication signal indicating whether an E-PDCCH is allocated to the second slot.

In the foregoing embodiments of the present invention, various methods for using an E-PDCCH have been described. An Enhanced PCFICH (E-PCFICH) may exist in a CSS. The E-PCFICH may carry an E-PDCCH indication signal. The E-PDCCH indication signal and the E-PCFICH signal may be positioned at the start or end of a legacy PDCCH region. Or the E-PDCCH indication signal and/or the E-PCFICH signal may be transmitted to a UE by higher-layer signaling.

5. Apparatuses

Figure 28:
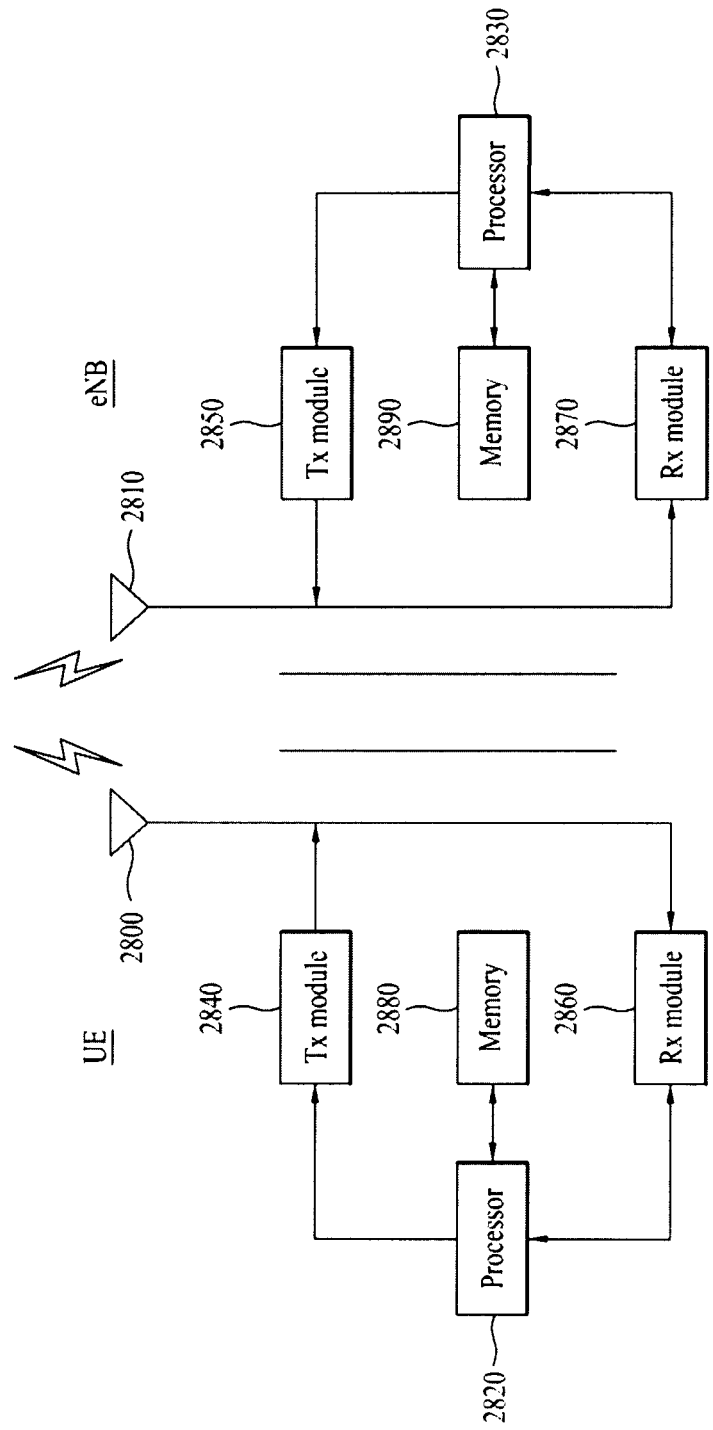
FIG. 28 is a block diagram of apparatuses that may implement the methods illustrated in FIGS. 1 to 27.

Apparatuses illustrated in FIG. 28 are means that can implement the methods described before with reference to FIGS. 1 to 27.

A UE may act as a transmitter on a UL and as a receiver on a DL. An eNB may act as a receiver on a UL and as a transmitter on a DL.

That is, each of the UE and the eNB may include a Tx module 2840 or 2850 and a Reception (Rx) module 2860 or 2870, for controlling transmission and reception of information, data, and/or messages, and an antenna 2800 or 2810 for transmitting and receiving information, data, and/or messages.

Each of the UE and the eNB may further include a processor 2820 or 2830 for implementing the afore-described embodiments of the present invention and a memory 2880 or 2890 for temporarily or permanently storing operations of the processor 2820 or 2830.

The embodiments of the present invention may be performed using the components and functions of the UE and the eNB. The apparatuses illustrated in FIG. 27, preferably the processors may further include components illustrated in FIGS. 12 and 14 or FIGS. 16 to 19.

The processor of the UE may receive a PDCCH signal and/or an E-PDCCH signal by monitoring a search space. Particularly, an LTE-A UE (i.e., a Rel-11 UE) may receive an E-PDCCH without blocking a PDCCH signal directed to a legacy UE by blind-decoding of a resource region indicated by an E-PDCCH indication signal.

After receiving the E-PDCCH indication signal, the processor of the UE may receive an E-PDCCH signal based on the presence or absence of the E-PDCCH and the allocation location and/or size of an E-PDCCH resource region.

The Tx and Rx modules of the UE and the eNB may perform a packet modulation/demodulation function for data transmission, a high-speed packet channel coding function, OFDMA packet scheduling, TDD packet scheduling, and/or channelization. Each of the UE and the eNB of FIG. 23 may further include a low-power Radio Frequency (RF)/Intermediate Frequency (IF) module.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a hand-held PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, WCDMA, etc.).

Embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. A software code may be stored in the memory 2880 or 2890 and executed by the processor 2820 or 2830. The memory is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The present invention is applicable to various wireless access systems including a 3GPP system, a 3GPP2 system, and/or an IEEE 802.xx system. Besides these wireless access systems, the embodiments of the present invention are applicable to all technical fields in which the wireless access systems find their applications.

The invention claimed is:

1. A method for receiving an Enhanced Physical Downlink Control Channel (E-PDCCH) signal in a wireless access system, the method comprising:
    receiving, by a user equipment, an E-PDCCH indication signal, including information indicating the presence or absence of an E-PDCCH signal and resource allocation information indicating a resource region of the E-PDCCH signal; and
    receiving, by a user equipment, the E-PDCCH signal in the resource region indicated by the resource allocation information,
    wherein the E-PDCCH indication signal is transmitted in a legacy PDCCH region,
    wherein the E-PDCCH signal is transmitted based on Demodulation Reference Signal (DMRS), and
    wherein the E-PDCCH signal is allocated by frequency-first mapping in reverse time order, starting from a last OFDM symbol carrying DMRS for the E-PDCCH signal among OFDM symbols of a subframe.

2. The method according to claim 1, wherein the E-PDCCH indication signal is transmitted in a Common Search Space (CSS).

3. The method according to claim 1, wherein the E-PDCCH indication signal is transmitted in a first Control Channel Element (CCE) of the legacy PDCCH region.

4. The method according to claim 1, wherein the E-PDCCH signal is allocated only to a first slot of the subframe carrying the E-PDCCH indication signal.

5. A method for transmitting an Enhanced Physical Downlink Control Channel (E-PDCCH) signal in a wireless access system, the method comprising:
    transmitting, by a base station, an E-PDCCH indication signal, including information indicating the presence or absence of an E-PDCCH signal and resource allocation information indicating a resource region of the E-PDCCH signal; and transmitting, by a base station, the E-PDCCH signal in the resource region indicated by the resource allocation information, wherein the E-PDCCH indication signal is transmitted in a legacy PDCCH region, wherein the E-PDCCH signal is transmitted based on Demodulation Reference Signal (DMRS), and wherein the E-PDCCH signal is allocated by frequency-first mapping in reverse time order, starting from a last OFDM symbol carrying DMRS for the E-PDCCH signal among OFDM symbols of a subframe.

6. The method according to claim 5, wherein the E-PDCCH indication signal is transmitted in a Common Search Space (CSS).

7. The method according to claim 5, wherein the E-PDCCH indication signal is transmitted in a first Control Channel Element (CCE) of the legacy PDCCH region.

8. The method according to claim 5, wherein the E-PDCCH signal is allocated only to a first slot of the subframe carrying the E-PDCCH indication signal.

9. User Equipment (UE) for receiving an Enhanced Physical Downlink Control Channel (E-PDCCH) signal in a wireless access system, comprising:
 a reception module;
 a transmission module; and
 a processor configured to support reception of an E-PDCCH signal, wherein the UE receives an E-PDCCH indication signal, including information indicating the presence or absence of an E-PDCCH signal and resource allocation information indicating a resource region of the E-PDCCH signal through the reception module, and receives the E-PDCCH signal in the resource region indicated by the resource allocation information through the reception module, wherein the E-PDCCH indication signal is transmitted in a legacy PDCCH region, wherein the E-PDCCH signal is transmitted based on Demodulation Reference Signal (DMRS), and wherein the E-PDCCH signal is allocated by frequency-first mapping in reverse time order, starting from a last OFDM symbol carrying DMRS for the E-PDCCH signal among OFDM symbols of a subframe.

10. The UE according to claim 9, wherein the E-PDCCH indication signal is transmitted in a Common Search Space (CSS).

11. The UE according to claim 9, wherein the E-PDCCH indication signal is transmitted in a first Control Channel Element (CCE) of the legacy PDCCH region.

12. The UE according to claim 9, wherein the E-PDCCH signal is allocated only to a first slot of the subframe carrying the E-PDCCH indication signal.

* * * * *